United States Patent
Lassota et al.

(10) Patent No.: US 9,532,682 B1
(45) Date of Patent: Jan. 3, 2017

(54) ELECTRICAL FOOD GRINDER WITH AN ELECTRONICALLY CONTROLLED MOVABLE ROTOR DRIVE MOTOR AND METHOD

(71) Applicants: Zbigniew G. Lassota, Long Grove, IL (US); Michael W. Lassota, Wauconda, IL (US); Woyciech Dymkowski, Konstancin (PL)

(72) Inventors: Zbigniew G. Lassota, Long Grove, IL (US); Michael W. Lassota, Wauconda, IL (US); Woyciech Dymkowski, Konstancin (PL)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 855 days.

(21) Appl. No.: 13/661,562

(22) Filed: Oct. 26, 2012

(51) Int. Cl.
A47J 42/18 (2006.01)
A47J 42/46 (2006.01)

(52) U.S. Cl.
CPC .............. *A47J 42/18* (2013.01); *A47J 42/46* (2013.01)

(58) Field of Classification Search
CPC ............ B02C 7/14; B02C 7/186; A47J 42/18; A47J 42/46
USPC ...................... 241/37, 261.2, 261.3
See application file for complete search history.

(56) References Cited

U.S. PATENT DOCUMENTS

| | | | | |
|---|---|---|---|---|
| 4,821,966 A | * | 4/1989 | Ephraim | B02C 7/14 241/247 |
| 5,509,610 A | * | 4/1996 | Gibbons | B02C 7/06 241/261.3 |
| 5,605,290 A | * | 2/1997 | Brenholdt | 241/21 |
| 2006/0261197 A1 | * | 11/2006 | Chan | A47J 42/06 241/169.1 |
| 2012/0006922 A1 | * | 1/2012 | Wilson | A47J 42/10 241/169.1 |

* cited by examiner

*Primary Examiner* — Mark Rosenbaum
(74) *Attorney, Agent, or Firm* — Potthast & Associates; James W. Potthast

(57) ABSTRACT

A grinder (30) has a toolessly attached ingredient hopper assembly (50) overlying a toolessly attached fixed grinding burr (134) defining the top of a grind chamber (158) within which is received a mating rotary grinding burr (150) that is slidably mounted to a rotary drive motor (154) for adjustment relative to the fixed grinding burr (134). Adjustment is achieved automatically by control of a stepper motor (168) that pushes on the end of an elongate control shaft (393) passing through a hollow rotary drive axle (392) and carrying the rotary grinding burr (150) at an opposite end. In a similar embodiment (FIG. 23), the non-rotary burr (314) is adjusted by movement of a control shaft (393) contained within a hollow motor axle (392). In other embodiments (FIGS. 17-22), a movable axle (304) of a movable rotor motor (300) and attached to the rotary burr (312) is moved to make the adjustments.

36 Claims, 24 Drawing Sheets

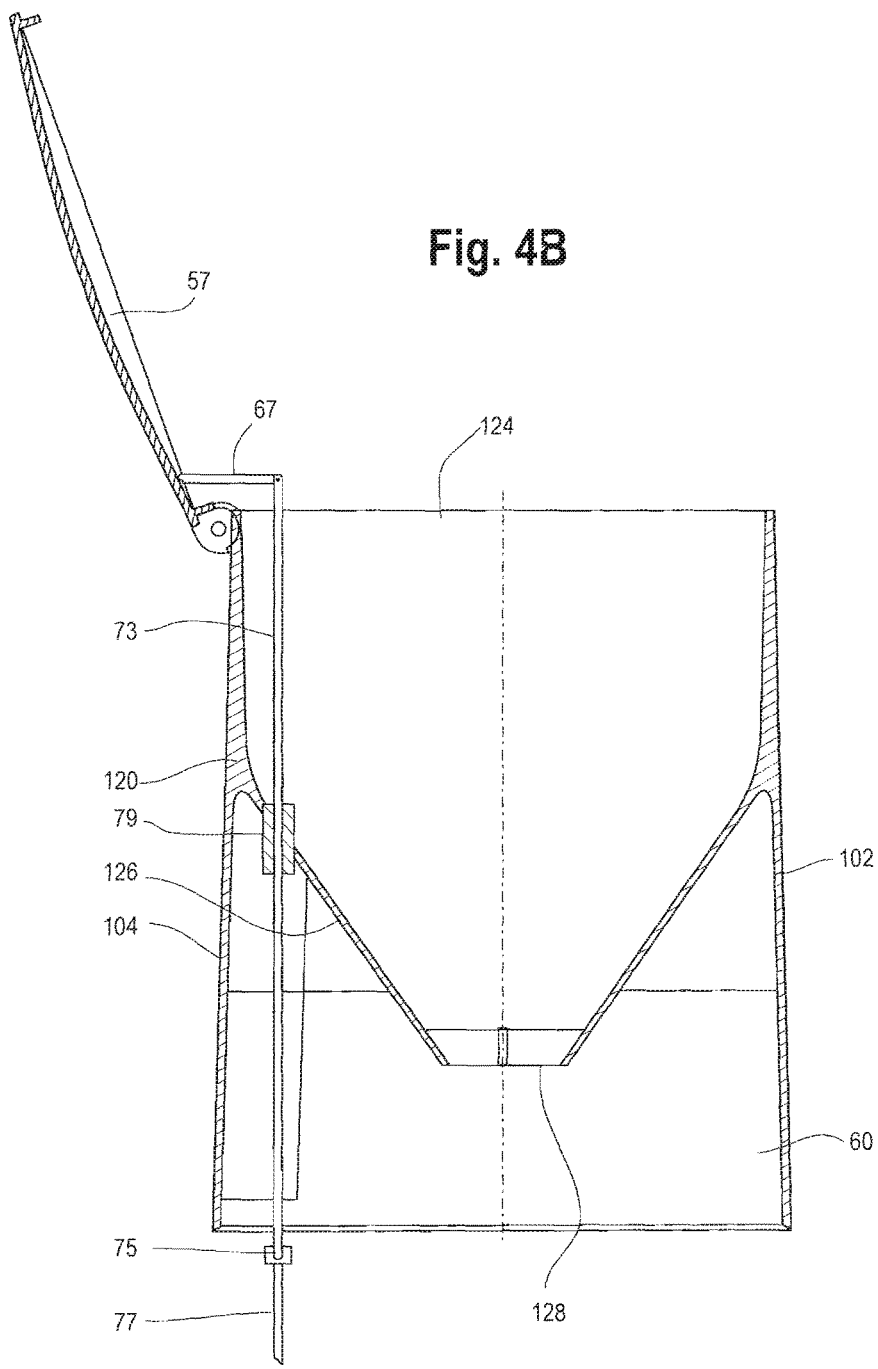

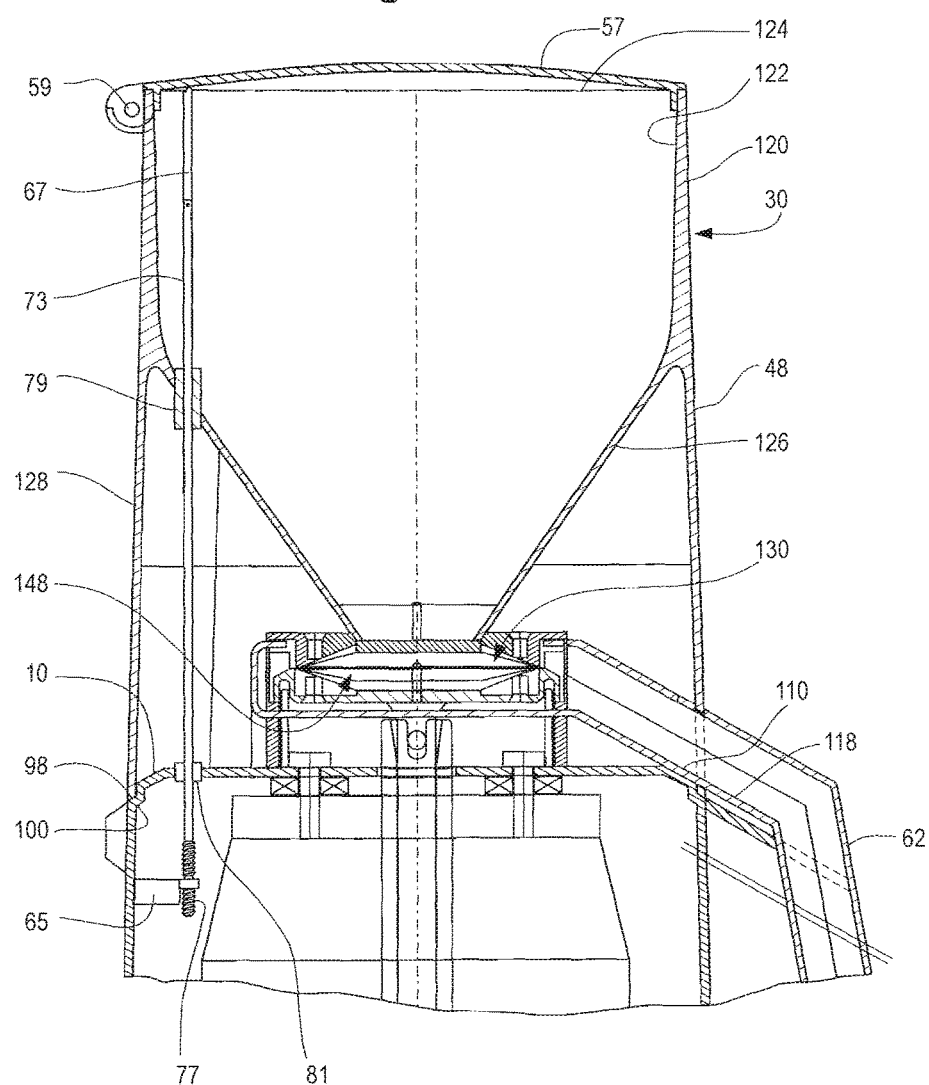

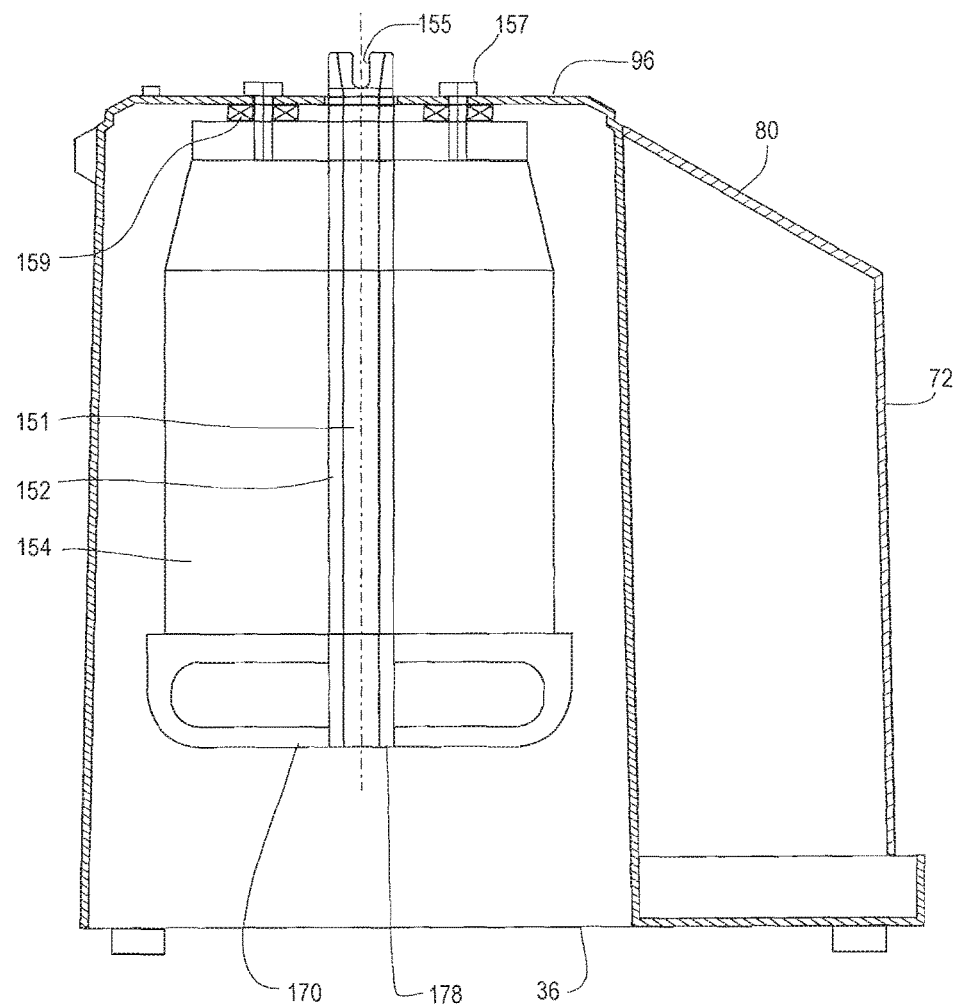
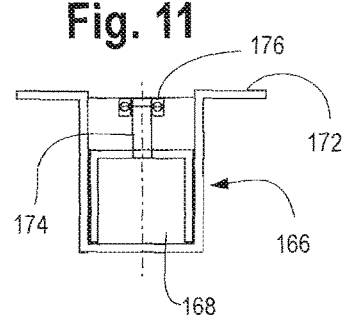

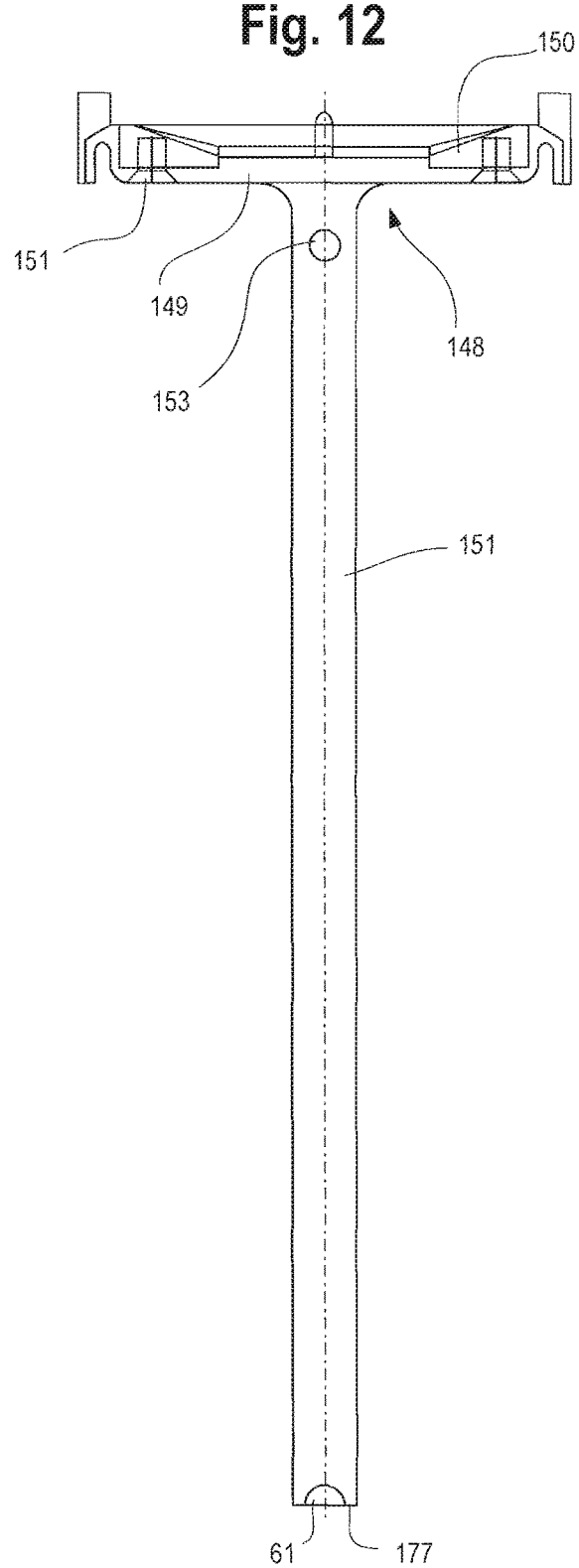

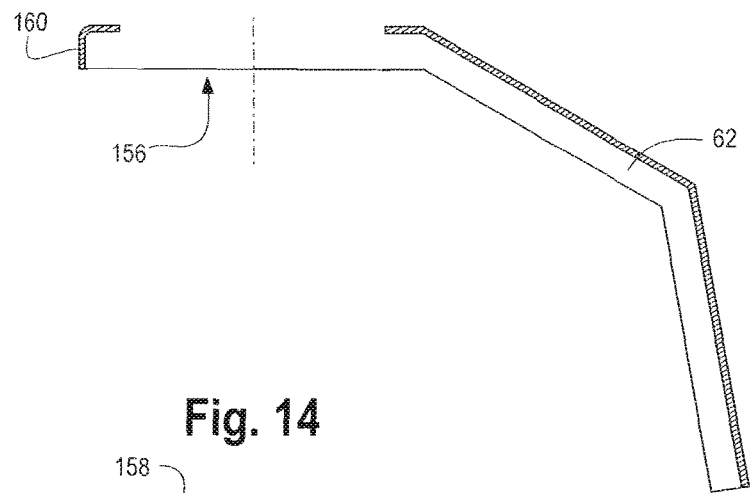
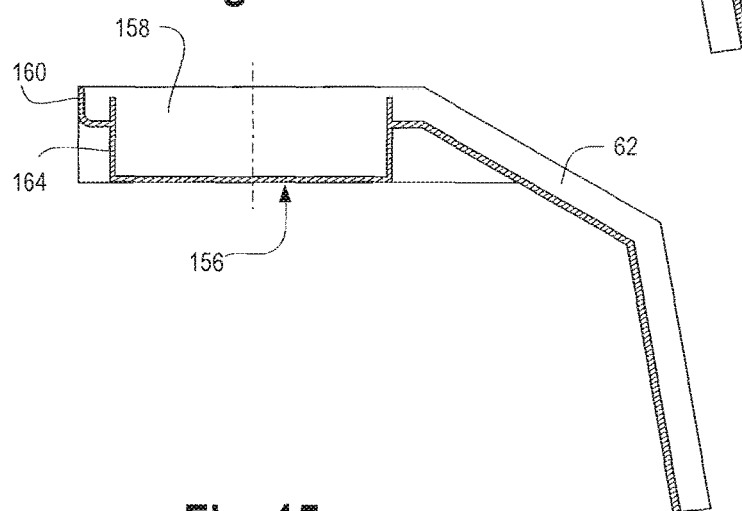
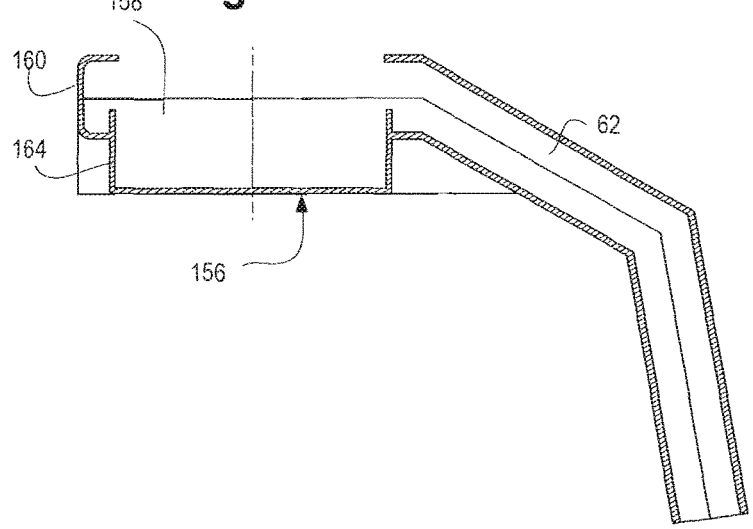

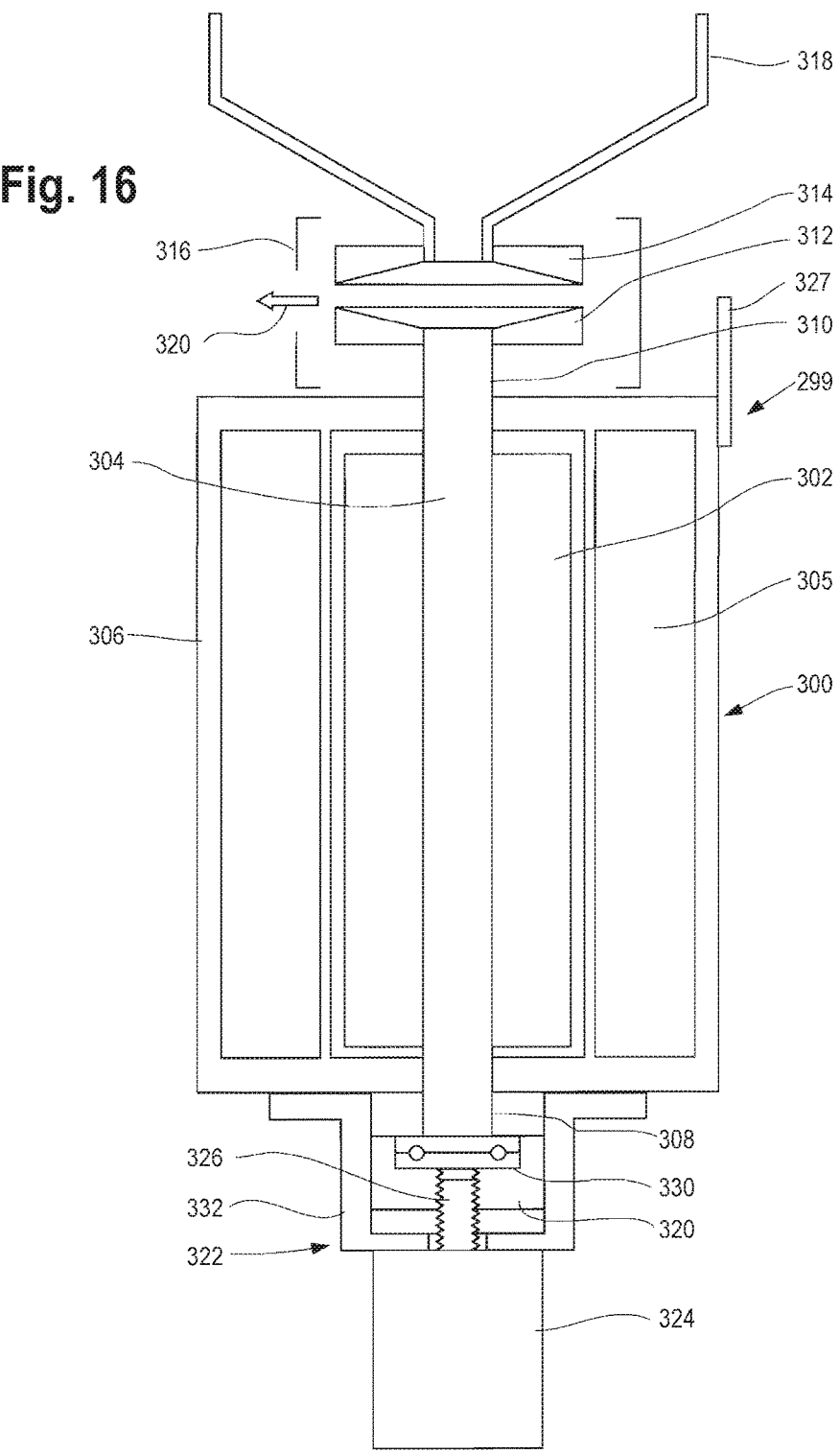

ELECTRICAL FOOD GRINDER WITH AN ELECTRONICALLY CONTROLLED MOVABLE ROTOR DRIVE MOTOR AND METHOD

CROSS-REFERENCE TO RELATED APPLICATION

This application is a continuation-in-part of, and claims the benefit under 35 U.S.C. 120 of, application Ser. No. 13/007,257 filed Jan. 14, 2011, which is hereby incorporated by reference.

BACKGROUND OF THE INVENTION

Field of the Invention

This invention generally relates to food grinders, and more particularly, to electric food grinders, such as electric coffee grinders.

Discussion of the Prior Art

Electrically powered food grinders, such a coffee grinders are well known for both commercial and home use. Such grinders are often provided in the coffee sections of grocery stores at which are shelved bags of unground coffee beans or which hoppers with coffee beans from which customers may fill empty bags provided near the hoppers. Customers who purchase the unground coffee are encouraged to use the provided coffee grinder to freshly grind their coffee.

Many such commercial coffee grinders found in stores have potential problems due to the inexperience of the customers using the grinders or due to inattentiveness. In ordinary course of operation, a customer first selects a prefilled bag of coffee beans or fills a bag from a supply container. The bag is then opened, if not already open, and the contents are poured into the top opening of a hopper. The now empty bag is then placed in a bag fill position beneath an outlet of the grinder from which the ground coffee is emitted. The customer may then manually adjust a knob or other mechanical device to select the coarseness of the grind. The customer then manually actuates a start switch which energizes a grinding drive motor to commence the grinding operation. The grinding operation may end a preselected amount of time after actuation of the start switch. The amount coarseness, or fineness, selected by the customer may also determine the length of time that the grinding continues.

One problem associated with know grinders is that the adjustment of the grinding burrs relative position for different degrees of coarseness of the grind does not allow fine adjustments or maintenance of batch-to-batch coarseness uniformity for the same grind setting.

Also, sometimes the grinding time is longer than necessary which causes excessive wear and tear on the grinding elements and the grinder drive motor. Another disadvantage of some known coffee grinders of the type used in stores is that they take up too much shelf space which is more profitably used to display products to be sold.

The correct operation of the grinder may not be intuitively known and written directions are often provided, but there is no assurance that customers will necessarily follow the directions and admonitions concerning proper use either due to lack of comprehension or subsequent attention to precisely what they are doing and when. Moreover, known food grinders employ mechanical adjustment that are subject to vibration, rough handling and wear due to excessive or abusive use which disadvantageously causes unintended, erroneous changes to actual grinding gap size for different selected grind settings.

Another problem associated with known food grinders is that the mechanical mechanisms for changing grinding gaps are designed for only a single set of tolerances for a given size and type of grinding burrs. Only the original exact grinding burr size and type will enable proper initial adjustment, thereby precluding field service replacement with grinding burrs of a type, configuration, thickness or size different from those of the original grinding burrs for which the grinder is designed.

A need therefore exists to provide a food grinder that overcomes these and other problems and disadvantages and the like.

SUMMARY OF THE INVENTION

It is therefore the object of the present invention to provide a food grinder that overcomes or ameliorates the problems and disadvantages of known food grinders noted above.

This object is achieved in part by providing a food grinder having a frame, a grinding chamber, a hopper for holding food ingredient to be ground with a chute for selectively passing the food ingredient to the grinding chamber, with a coarseness controllable grinding mechanism, having an electrical, rotary, drive motor with a motor frame supporting a fixed stator surrounding a rotor mounted for elongate movement relative to the stator, said rotor fixedly attached to a central, rotary, motor axle with opposite ends that are accessible outside of opposite ends of the motor frame, respectively; a fixed grinding burr contained within the grinding chamber; a rotary grinding burr contained within the grinding chamber and separable from the fixed grinding burr by a grinding gap; means attaching the rotary grinding burr to one of the opposite ends of the motor axle; and a controllable electromechanical device engaged with another one of the opposite ends of the motor axle for selectively, longitudinally moving the motor axle relative to the motor frame to selectively adjust the grinding gap.

Preferably, the grinder includes means for controlling the controllable electromechanical device to move the rotating grinding burr into contact with the fixed grinding burr until the electrical drive motor temporarily stalls to establish a null, or zero distance set point, from which subsequent gap distances are measured. In some embodiments, the controllable electromechanical device is a stepper motor and in other embodiments, the motor is a piezoelectric motor, or piezo motor. In some embodiments the stepper motor has a housing and a pusher rod that moves longitudinally relative to the housing pushes against a thrust bearing engaged with the other end of the movable axle when the stepper motor is energized. The pusher rod is connected to a rotary thrust bearing that is engaged with the other one of the opposite ends of drive motor axle.

In another embodiment, the stepper motor has a rotary axle that is linked to the other one of the opposite ends of the motor drive axle by a pusher linkage including a rotary thrust bearing engaged with the other one of the opposite ends of the motor drive axle in a pushing relationship.

In some embodiments the movable drive motor axle is vertically aligned, having the one of the opposite accessible ends of the motor axle is a lower end with which the controllable electromechanical device is engaged located beneath and opposite to the other upper end to which the rotary grinding burr is attached. In such case, the weight of the rotor and the drive motor axle is supported at least in part by the controllable electromechanical device, and upward movement of the axle by the electromechanical means being resisted by the weight of the drive motor rotor and axle while downward movement of the electromechanical device is followed by downward movement of the longitudinally movable rotor and axle due to the weight of the rotor and axle.

In other embodiments in which the movable drive motor axle is horizontally aligned. In such case in which the force of gravity will not press against the controllable electromechanical adjustment, and means are provided for resiliently spring biasing the other one of the accessible ends of the movable drive motor axle and the movable rotor in a direction toward the one end other end of the axle linked to the controllable electromechanical adjustment device. Preferably, in which the resilient pressing means includes at least one spring washer surrounding the movable axle.

The objective of the invention is also obtained in part by provision of a method of grinding food ingredient with a food grinder having a pair of grinding burrs by performing the steps of selecting a level of grind coarseness from a plurality of different levels; electronically controlling an electromechanical device to selectively move at least one of a pair of mating grinding burrs a preselected distance to establish a preselected gap size between the grinding burrs associated with the selected level of grind coarseness; calibrating the electromechanical device before establishing the preselected gap size and before a grinding operation is performed by first moving the grinding burrs into direct contact with each other to establish a zero gap set point from which subsequent gap settings are determined; increasing the gap by moving the at least one grinding burr by the preselected distance from the zero gap set point to establish the preselected gap size associated with the selected level of grind coarseness; and performing a grinding operation with the grinding burrs by rotating at least one of the grinding burrs while being separated from the other grinding burr by the preselected gap size.

The step of calibrating may be performed before each grinding cycle, periodically after each of a preselected plurality of grinding operations or periodically after each of a plurality of preselected time periods.

Preferably, the step of calibrating includes the steps of rotating one of the pair of grinding burrs with an electric drive motor, moving at least one of the pair of mating grinding burrs into sufficient contact with another one of the pair of mated grinding burrs to cause the drive motor to momentarily stall, storing a position of the at least one mating grinding burr being moved when the drive motor stalls, and setting the stored position as a zero set point from which to measure subsequent the amounts of movement of the at least one grinding burr to establish different preselected gaps. During the calibration step, the output power and speed of the drive motor may be reduced beneath that provided for regular grinding operation. The duration of the contact needed to establish the null calibration point may be so brief that it is not discernable. The relationship between the plurality of different gaps sizes may be either linearly related or non-linearly related to each other or to the associated coarseness settings.

Preferably, the grinding method of claim includes the step of automatically decreasing the gap to a minimum gap size associated with the least level of grind coarseness after completion of a grinding operation to prevent intrusion of food ingredient particles larger than the minimum gap size until the start of a new grinding operation.

Thus, achievement of the object of the invention is also partly acquired by providing a food grinder having a pair of grinding burrs with a coarseness setting apparatus, having means for selecting a level of grind coarseness from a plurality of different levels; an electronic controller controlling an electromechanical device to selectively move at least one of a pair of mating grinding burrs a preselected distance to establish a preselected gap size between the grinding burrs associated with the selected level of grind coarseness; means for calibrating the electromechanical device before establishing the preselected gap size and before a grinding operation is performed by first moving the grinding burrs into direct contact with each other to establish a zero gap set point from which subsequent gap settings are determined, means for increasing the gap by moving the at least one grinding burr by the preselected distance from the zero gap set point to establish the preselected gap size associated with the selected level of grind coarseness; and means for performing a grinding operation with the grinding burrs by rotating at least one of the grinding burrs while being separated from the other grinding burr by the preselected gap size.

Achievement of the object of the invention is also obtained by providing a method of grinding for use in a food grinder having a pair of grinding burrs contained within a grinding chamber and a hopper for holding food ingredient to be ground and selectively passing the food ingredient to the grinding chamber, by performing the steps of manually selecting one of a plurality of different coarseness settings respectively associated with a plurality of different sized spatial gaps between the grinding burrs; and linearly moving a rotary one of the pair of grinding burrs attached to a front end of a rotatable motor axle of an electrical grinder drive motor by linearly moving the axle by pushing on a back end of the rotatable motor axle until the gap between the pair of grinding burrs is corresponds to the one selected coarseness setting. Preferably, the electrical grinder drive motor has a rotor to which the axle is attached and a stator, and the method includes the step of longitudinally moving the rotor relative to the stator in response to movement of the axle relative to the stator.

Also, partly acquiring the object of the invention, a method is provided for use in a food grinder having a frame, a grinding chamber, a hopper for holding food ingredient to be ground with a chute for selectively passing the food ingredient to the grinding chamber, the improvement being a method of grinding, by performing the steps of providing an electric, rotary, drive motor with a hollow, elongate, rotary, motor drive shaft extending through the motor between a front and a back of the motor; attaching an end of the hollow, rotary drive shaft to a rotary grinding burr contained within the grinding chamber to selectively rotate the rotary grinding burr when the electric, rotary, drive motor is energized; attaching a fixed, non-rotary grinding burr contained within the grinding chamber in grinding relationship with the rotary grinding burr to an elongate, positioning control shaft extending though the hollow, elongate, rotary motor drive shaft; selectively sliding the elongate, positioning control shaft within the hollow drive shaft to different relative positions to selectively, longitudinally move the fixed, non-rotary grinding burr to different, longitudinal, grinding positions relative to the rotary grinding burr to selectively change the coarseness of the grind.

Preferably, the step of selectively sliding the control shaft includes the steps of selectively actuating an electromechanical drive mechanism, linking the electromagnetic drive mechanism to the elongate, positioning control shaft to longitudinally move the control shaft when the electromechanical drive mechanism is energized, and selectively controlling the electromechanical drive mechanism to selectively change the grinding position of the fixed grinding burr relative to the rotary grinding burr.

The object is also partly obtained by providing a food ingredient grinder having a pair of grinding burrs contained within a grinding chamber and a hopper for holding food ingredient to be ground and selectively passing the food ingredient to the grinding chamber, with a grinding gap adjustment device having means for manually selecting one of a plurality of different coarseness settings respectively associated with a plurality of different sized spatial gaps between the grinding burrs, and means for longitudinally linearly moving a rotary one of the pair of grinding burrs attached to a front end of a rotatable motor axle of a movable rotor drive motor by linearly moving the axle until the gap between the pair of grinding burrs corresponds to the one selected coarseness setting.

BRIEF DESCRIPTION OF THE DRAWINGS

The foregoing advantageous features and objectives of the invention will be described in detail, and others will be made apparent, from the detailed description of the preferred embodiment given below with reference to the several figures of the drawing, in which:

FIG. 4B is a side view of only the hopper of FIG. 4 illustrating the mechanism for automatically raising the lid when the lid is in a raised position;

FIG. 4C is an enlarged portion of the grinder of FIG. 4, illustrating the mechanism for automatically closing the lid when in a closed position;

FIG. 10 is sectional side view of the grinder assembly similar to that of FIG. 4 but with the hopper assembly, a fixed grinding burr assembly, a grinding manifold including an exit chute and a movable, rotatable grinding burr assembly have been removed to facilitate viewing of the drive assembly including the relationship between a grinder rotary drive motor and the grinder housing;

FIG. 11 is a sectional side view of an axial-thrusting, stepper-motor assembly that that has been separated from combination with other elements of the grinder assembly of FIGS. 1 through 4;

FIG. 12 is a sectional elevation view of an adjustable, or movably mounted, grinding burr assembly that has been removed from combination with the other elements of the grinder assembly of FIGS. 3 and 4;

FIGS. 13, 14 and 15 are a succession of sectional side views of the manifold and chute assembly previously seen in combination with the other elements of the grinder assembly, as viewed in FIG. 4;

FIG. 16 is a side view of an alternative arrangement of the grinding drive motor and coarseness adjustment mechanism in which the motor axis and burrs have a horizontal rotary axis, and the non-rotating, or fixed grinding burr, instead of the rotating grinding burr, as in the embodiment shwon in FIGS. 3, 3A, 4 AND 4A is laterally moved to adjust grind coarseness.

DETAILED DESCRIPTION

Figure 1:
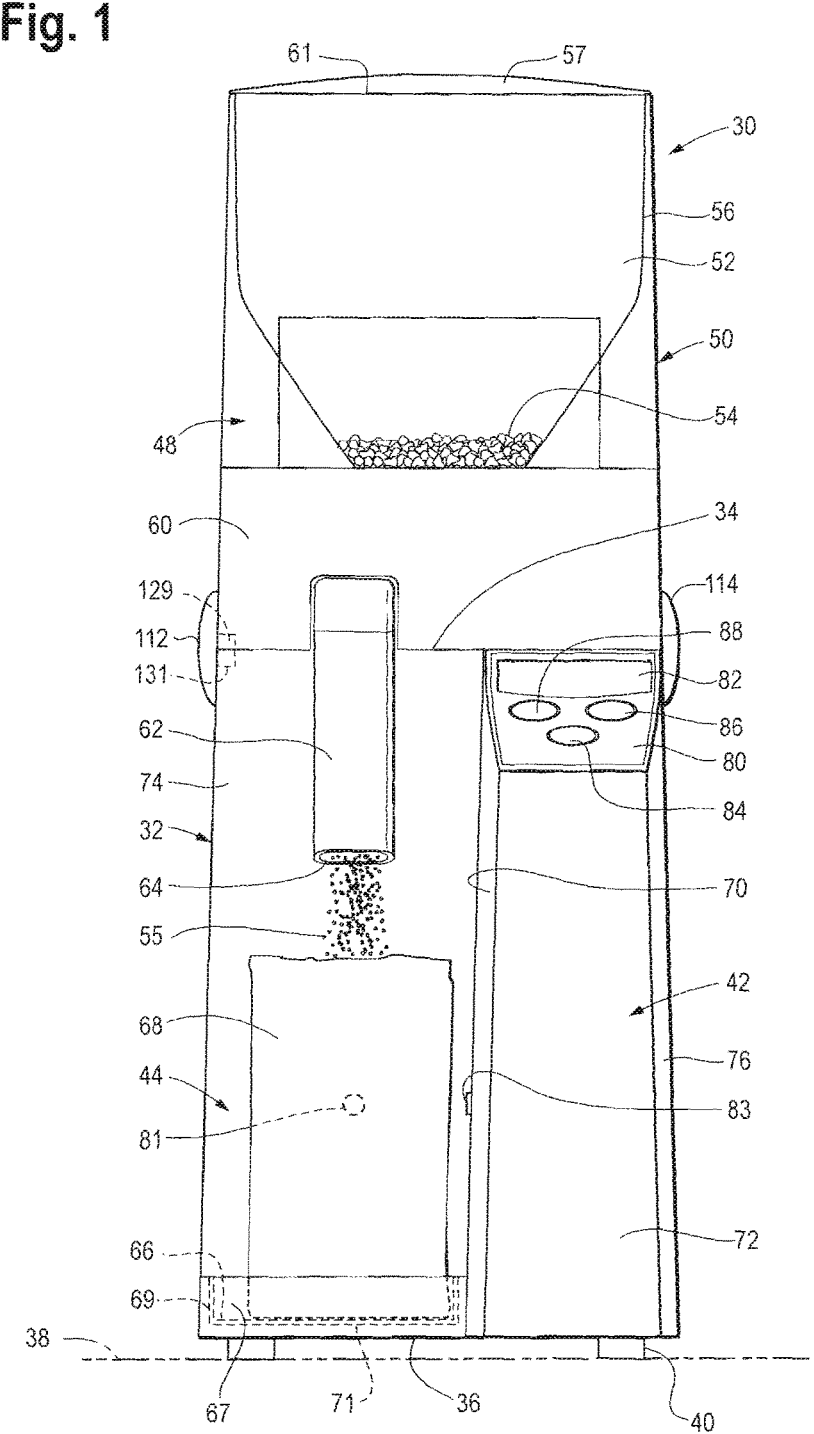
FIG. 1 is a front elevation view of the preferred embodiment of the grinder assembly of the present invention.
Figure 2:
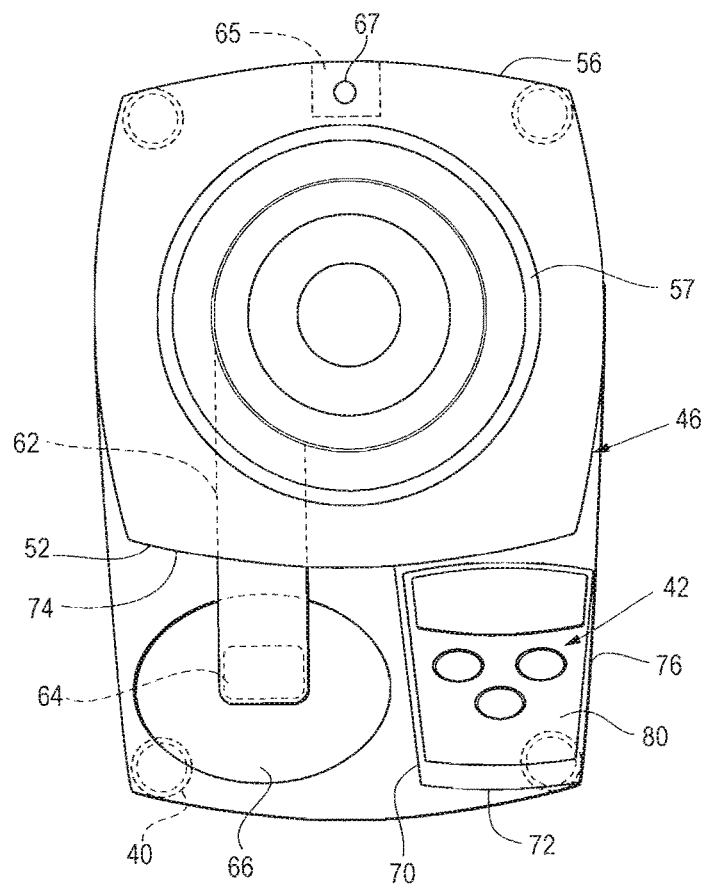
FIG. 2 is a plan view of the grinder assembly of FIG. 1.

Referring to FIGS. 1 and 2, a preferred embodiment of the food ingredient grinder assembly, or grinder, 30 of the present invention is seen to include a housing assembly with a lower housing section 32 having a top 34 and a bottom 36 supported above a counter top or other support surface 38 by four, substantially identical, corner legs 40. The lower housing section 32 includes a forwardly extending control panel section 42 and a relatively recessed bag support section, or location, 44. Height is approximately no more than twenty-one inches; the width is approximately no more than seven inches and the depth is approximately no more than fifteen inches Supported on a back portion 46 of the top 34 of the lower housing section 32 is a manually, toolessly, removable hopper housing assembly 48 having an upper section 50 with a hopper 56. The hopper housing assembly 48 may be manually removed from, and operatively reattached to, the remainder of the grinder 10 without the need for any tools. The upper section 50 is formed of four, substantially identical, outwardly extending, convex, curved, interconnected sidewalls. A front sidewall 52 of the interconnected sidewalls is translucent, preferably transparently translucent, at least in part, to enable viewing of food ingredient 54 to be ground, such as coffee beans, contained within the hopper 56 in the upper section 50.

Figure 3:
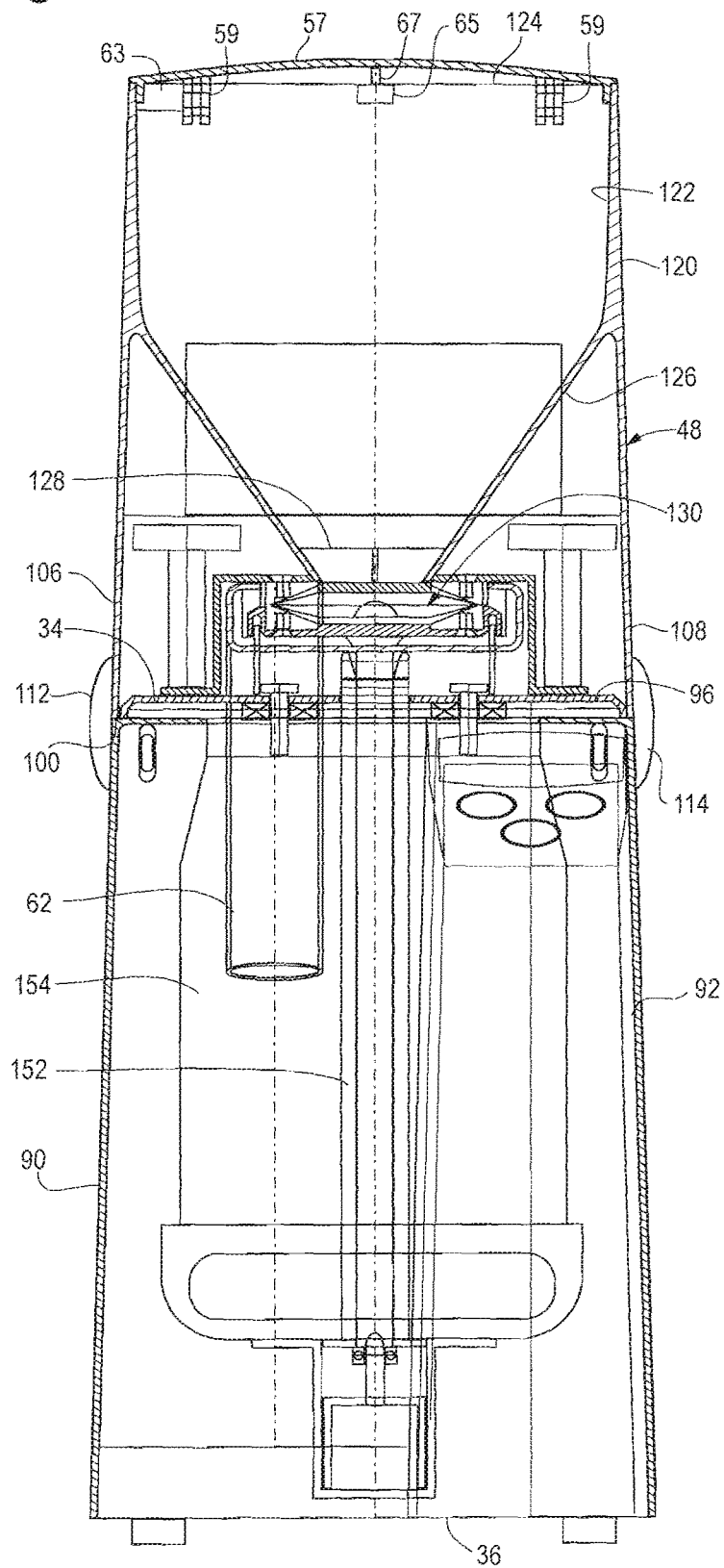
FIG. 3 is a sectional front elevation view of the grinder assembly of FIGS. 1 and 2.

The hopper 56 is protectively housed within and supported by the four interconnected sidewalls of the upper section 50 including the front sidewall 52. The back of a top cover 57 is pivotally mounted to the top of the hopper 56 by means of a pair of hinges 59 at the back 61 of the hopper 56, as seen in FIG. 3. The hinges 59 are spring biased by a spring 63 to automatically move the top cover 57 to a closed position covering a hopper inlet opening 61, and to hold the top cover 57 in the closed position, as shown in FIG. 1, unless raised to an open position to allow ingredient to be dumped through the inlet opening 61 and into the hopper 56.

Figure 7:
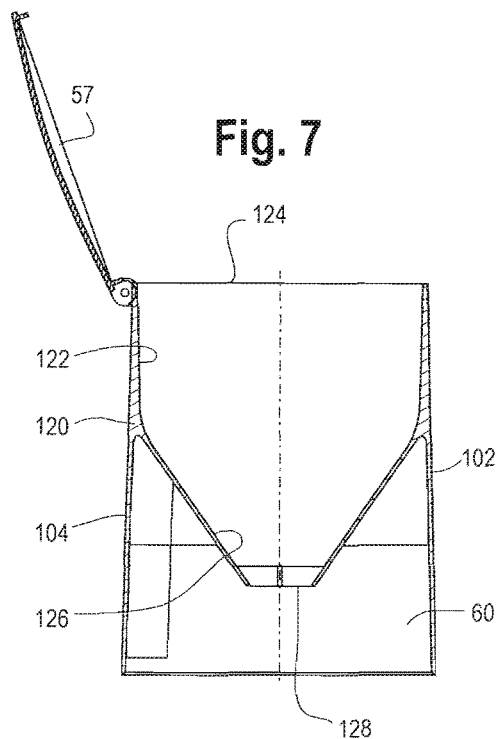
FIG. 7 is a side elevation view of the hopper assembly of the grinder assembly of FIGS. 1-4 which has been removed from the remainder of the grinder assembly and in which a hopper cover is in a retracted, open position to enable receipt of the food ingredient into the hopper body through an upwardly facing top and inlet opening of the hopper body.

The top cover 57 may be manually opened by pivoting it upwardly, but preferably it is selectively automatically opened by an electromechanical, automatic opener that is selectively controlled to pivot the top cover 57 to the open position, as shown in FIG. 7. Preferably, the automatic opener includes a solenoid, servo motor or other suitable electromechanical device, 65 or the like secured to the interior of back side of the hopper assembly with a longitudinally movable pusher rod 67 of a an automatic lid opener and closer, linked to the underside of the cover to push it upwardly to an open position, as shown in FIG. 4B, or to pull it or allow it to move downwardly under force of the bias spring 63 to a closed position, as shown in FIG. 4C. Alternatively, the automatic opener may comprise a small rotary servomotor linked to a portion of the hinge 59 and connected to the cover 57 to selectively pivot the cover 57 to the open position. Electrical power connection to the servomotor 63 is made though suitable electrical leads and releasable electrical connectors (not shown) protectively contained within the sidewalls of the hopper assembly body.

A lower section 60 of the hopper housing assembly 48 is defined by four lower sidewalls that are a downward continuation of the four interconnected sidewalls of the upper section 50. All the sidewalls of the lower section 60 are opaque to prevent viewing into the lower section 60. The lower section 60 protectively surrounds other operational elements of the food ingredient grinder 30 that will be explained in detail below with reference to other drawing figures. These other operational grinding elements grind the unground ingredient 54 to make it into ground ingredient and then pass the ground ingredient 55 to a chute 62. The ground ingredient 55, such as ground coffee beans, passes from the operational grinding elements within the lower section 60 through the chute 62 to an outlet 64. The outlet 64 faces downwardly and directly, vertically overlies a bag support surface 66 of the recessed bag support section 44.

The bag support surface 66 is preferably the bottom of a removable catch pan 67 with surrounding sidewalls 69, FIG. 1, for containing any possible ingredient that may overflow from the top of the bag 68 or which inadvertently misses the bag. The catch pan 67 is supported within a mating depression 71 in the bottom 36 that is generally larger than the bottom of the bag 68. The distance between the support surface 66 and the overlying chute outlet 64 bag support surface accommodates bag sizes from eight inches to fourteen inches in height for holding one to two pounds of ground coffee, or the like. The hopper capacity is approximately two pounds of coffee beans, which because they are unground, require a larger volume than the fourteen inch bag. After the bag is removed, the catch pan 69 may be removed from the mating depression 71 and any ground coffee 55 in the catch pan 69 poured into the bag. If the bag is already filled, the excess may be poured into an overflow bag or other container for later use by returning it to the hopper, or disposal.

During the grinding operation an empty, open bag 68, or other suitable container, is supported within the catch pan 69 with the open top facing upwardly beneath the outlet 64 of the chute 62 for receipt of ground coffee beans or other food ingredient released from the outlet 64.

The forwardly extending control panel section 42 has an interior side wall 70 that provides lateral support for the bag 68 and also provides an alignment indicator to guide the bag in proper position on the bag support surface 66 directly beneath the outlet 64. The interior sidewall 70 extends from a front wall 72 of the control panel section 42 to a front wall 72 of the bag support section 44. The front wall 72 is generally aligned with and forms a continuous surface with the front wall 52 of the upper, removable hopper assembly 48. The back wall 74 provides another guide for correctly locating the bag 68 on the bag support aligned beneath the outlet 64. An outer sidewall 76 of the control panel forms a continuous surface with the sidewall 78 of the back portion 46 of the lower housing assembly.

The top, or control panel, 80 of the control panel section 42 is sloped downwardly and forwardly from the front wall 52 adjacent the top 34 of the lower housing section to the front wall 72 of the of the control panel section 42. This slope facilitates visibility of the control panel 80 and the display and operator controls mounted to the control panel 80. In addition, it prevents resting drinks and the like on the control panel 80 that might cause damage, stains or otherwise or interfere with operation of the controls.

Preferably, a forwardly facing photosensor 81 in the back wall detects when a bag is laterally aligned with the chute outlet 64, and a sideways looking photosensor 83 in the sidewall 70 senses when a bag 68 is forwardly aligned with the chute outlet 64. In order to prevent spillage, both sensors 81 and 83 must sense the presence of the bag 68 in order for a grinding cycle to begin, or if a grinding cycle has already begun, for the grinding operation to continue. In lieu of photosensors, the sensors 81 and 83 may be replaced by capacitive sensors, touch sensors or any other like bag detection devices.

The front wall 72 of the control panel section 42 is preferably a translucent backlit advertising panel containing color advertising graphics, photographs and advertising messages. Preferably, the advertising panel is formed of double-walled, transparent plate with a gap for receipt of different, interchangeable, translucent advertising inserts that carry the advertising material.

The display and operator controls preferably include a liquid crystal display 82 for display of alphanumeric messages and associated graphics that may be used to communicate with the user to provide prompts for operation of the grinder. The display 82 is also usable for communications with an operator, maintenance technicians or installer during parameter programming and operations monitoring. The display 82 may also be an interactive screen, or touch-screen, which may be used for inputting information simply by touching the screen at selected displays of icons to select the control functions associated with grinder operations. Preferably, a voice simulator speaks whatever message is being displayed.

In addition, mounted to the control panel are three backlit switches including a start-grind switch 84, a grind setting selection switch 86 and a screen navigation switch 88. There are preferably six grind settings: Espresso, represented by a espresso machine icon shown on the display 82; Drip Single cup, represented by the number one within a small flat bottom filter; Drip Four Cup, represented by the number four within a small flat bottom filter icon; Drip Twelve Cup, represented by the number twelve within a larger flat bottom filter; Drip Woven Wire Screen, represented by a woven wire filter icon; and French Press, represented by a French Press icon. The actual different relative grinding positions between the grinding elements associated with the six possible settings are preferably pre-set at the point of manufacture, but they may also be adjusted in the field by qualified personnel that have access codes to enable changing the preselected grind settings.

Figure 4A:
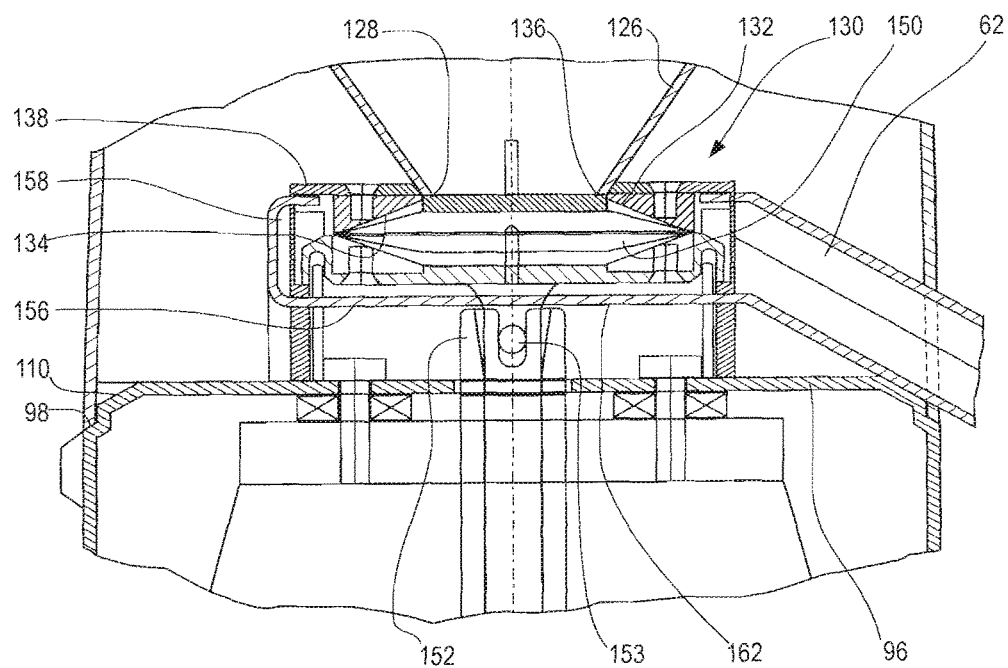
FIG. 4A is an enlarged portion of the sectional, side elevation view of the grinder assembly of FIG. 4.
Figure 4:
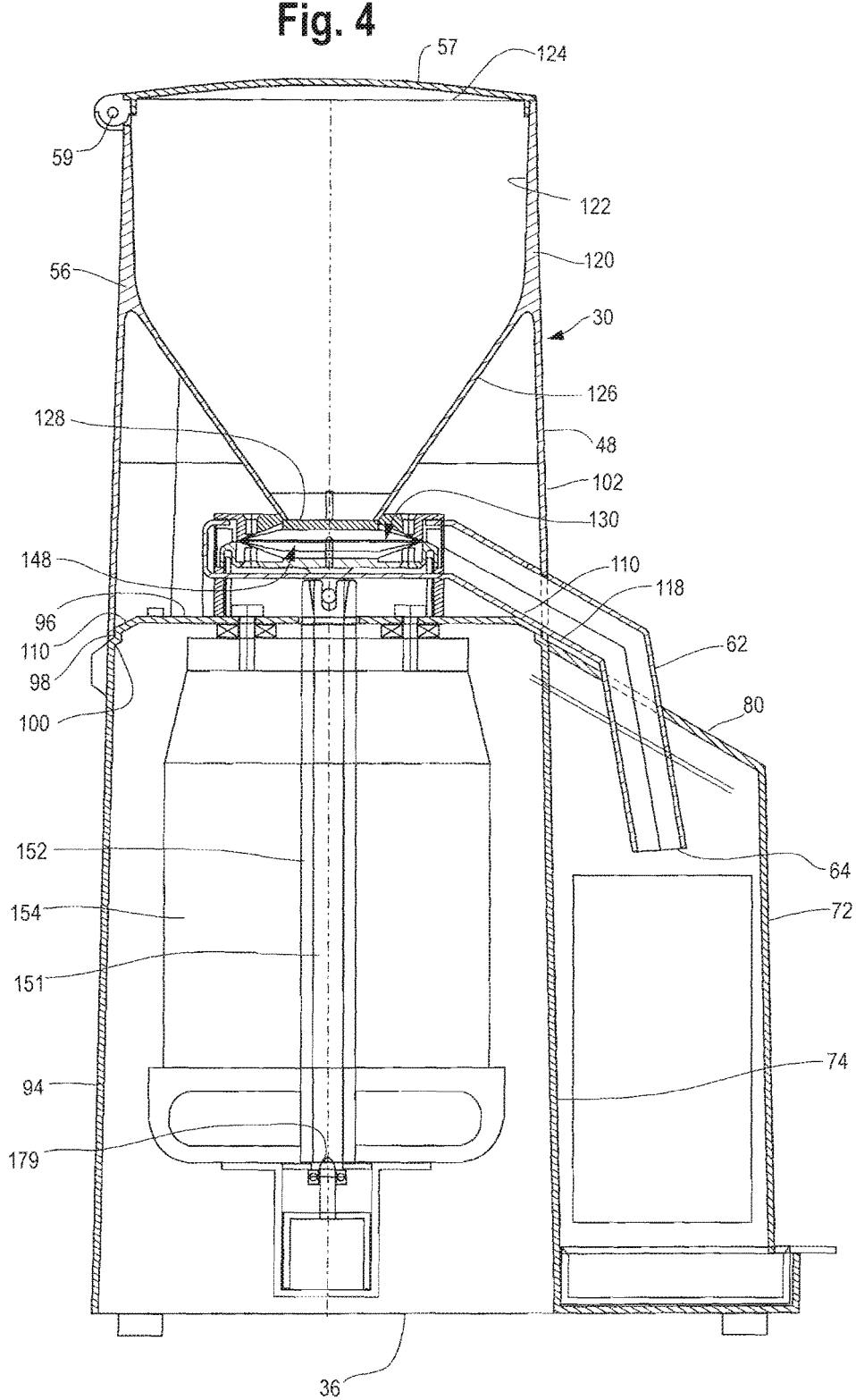
FIG. 4 is a sectional, elevation side view of the grinder assembly of FIGS. 1, 2 and 3.

Referring to FIGS. 3 and 4, the back portion 46 of the lower housing section 32 functions as a main frame, with a frame body extending between the top 34 and the bottom 36. This frame body includes four generally substantially identical sidewalls 90, 92, 94 and 74 that are respectively connected along their vertical extents at four corners. Wall 74 extends across the front; wall 94 extends across the back; wall 90 is on the left side and wall 92 is on the right side. All the walls are slightly tapered inwardly and upwardly for enhanced strength and stability, and are all joined at their top edges to a generally horizontal, planer frame member 96 at the top 34. Preferably, the walls 90, 92, 94 and 74 and the planer frame member 96 are integrally formed from a single piece of molded plastic or other like synthetic material.

At the tops of all the walls are substantially identical, inwardly extending, horizontally aligned shoulders, or support ledges, 98 upon which the bottom edge 100 of the mating walls 102, 104, 106 and 108 of the hopper and housing assembly 48 are releasably supported. The shoulders are preferably outwardly and downwardly sloped to facilitate fitting the bottom edges 100 onto the shoulders 98. Also, located inwardly adjacent each of the support ledges are downwardly and outwardly extending guide surfaces 110 to guide the bottom edges 100 outwardly onto the support ledges 98 as the hopper assembly 48 is lowered down onto the main frame.

Likewise, referring to FIG. 3, the top of wall 94 has a rearwardly and downwardly extending support member 116 with a top surface that forms a continuous extension of the support ledge 98 to provide an additional support during mounting. This additional support is achieved by first placing the rear edge on the support member 116 and then tipping the hopper assembly 48 forwardly until the front bottom edge 100 is received on the support ledge 98 at the front. The guide surface 110 at the front is parallel to and provides underlying support for an inner downwardly and outwardly extending section 118.

Once the hopper and housing assembly 48 has been lowered into place, a pair of lateral restraint members 112 and 114 respectively mounted to the outside surfaces of the side walls 90 and 92 and extend above the support ledges 98 to block bottom edges from moving outwardly off of the support ledges 98. The lateral restraint members 112 and 114 overlap the junction between the bottom edge 100 and the support ledge 98.

Referring to FIGS. 4B and 4C, the pusher rod 67 is pivotally linked to an upper end of an elongate pusher member 73 that extends through the conical wall 126 of the hopper to a distal end 75 that is engaged by a drive member 77 of the electromechanical drive mechanism 65 mounted to the back of the lower frame. The upper end of the drive member 77 preferably has an upwardly facing convex seat for guided receipt and support of the lower end of the pusher member 73, but is not fixedly attached to the drive member to allow the hopper to be toolessly removed and remounted. The drive seat is preferably rotatably mounted to the drive member by means of ball bearings 181, FIG. 11. The elongate pusher member passes through holes surrounded by suitable resilient sealing grommets 79 and 81.

Figure 8:
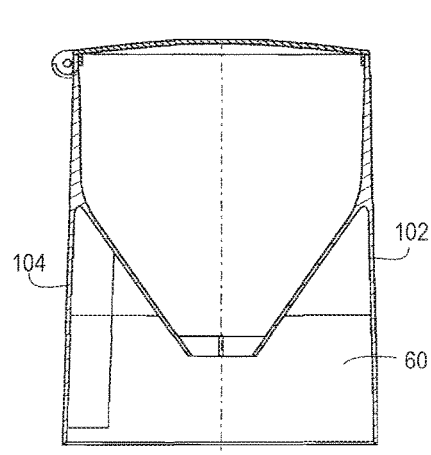
FIG. 8 is another side elevation view of the hopper assembly similar to that of FIG. 7 but in which the hopper cover has been returned to a closed, locked position in which the inlet opening to the hopper body is covered.
Figure 9:
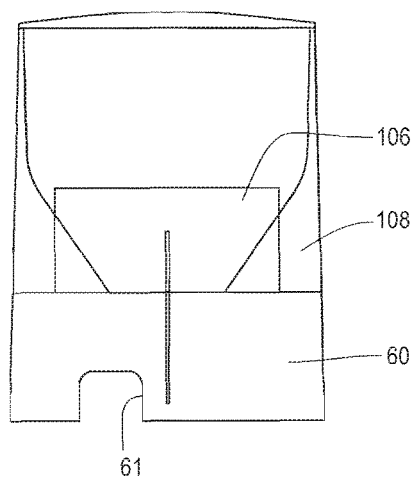
FIG. 9 is a front elevation view of the hopper assembly of FIG. 8.

Referring also to FIGS. 7, 8 and 9, the hopper 56 of removable ingredient hopper assembly 48 has an upper section 120 with a cross section that is generally square, except for the outward bowing of the walls, and an open top 124. The open top as previously noted is selectively closed by hinged cover 57. The interior surface 122 of the upper section is slightly inwardly, downwardly tapered to facilitate downward inward movement of the ingredient 54 to a lower generally conical section 126. The generally conical section 126 has a tapered body extending substantially inwardly and downwardly from the bottom of the upper section 120 to a relatively narrower hopper open outlet 128. As best seen in FIG. 9, a slot 61 is contained in the bottom 34 of the lower opaque section 60 of the hopper assembly to accommodate the chute 62.

The walls 102, 104 and 106 extend generally straight down from the juncture of the upper section 120 and the lower conical section 126 and protectively surrounded the conical section 126 in spaced relationship. They also protectively surround other elements located between the conical section 126 and the walls 102, 104, 106 and 108 and beneath the open hopper outlet 64. The bottoms of the walls 102, 104, 106 and 108 are merely resting upon the top edge 100 of the top of the lower housing section, or frame, 32, as seen in FIG. 1. Thus, the hopper assembly 56 is toolessly-manually, releasably supported by the frame 32 in an operative position with the hopper outlet 128 being open to pass ingredient within the body downwardly. Preferably, the bottom of the hopper 56 and the top of the frame 32 carry at least one set of mating magnetic connectors 129 and 131, FIG. 1, to facilitate securement of the interconnection between them.

The terms tooless-manually or toolessly is intended to mean that the item in question is manually removable or mountable without the need for, or use of any hand tools, such as wrenches, screw drivers and the like. Dismounting of the hopper assembly 56 is achieved merely by manually grasping and manually lifting the hopper assembly 56 off of the lower housing section, or frame, 32. Mounting of the hopper assembly 48 is likewise achieved simply by manually lowering the hopper assembly down onto the top edge 102 of the lower section 32 between the lateral restraint members 112 and 114 without the use of tools. The magnetic connectors 129 and 131 eliminate the need to mechanically latch or lock the hopper assembly 56 to the lower housing section 32. Advantageously, this tooless attachment and separation of the hopper assembly 56 significantly increases the speed with which one hopper may be replaced with another or removed for access to the lower elements of the food grinder 30 located beneath the hopper outlet 128 and then reconnected.

Once the hopper assembly 48 is removed from the top of the lower section, the other elements of the food ingredient grinder 30 located beneath the hopper assembly 48 may also be toolessly removed for repair, replacement or cleaning.

Figure 3A:
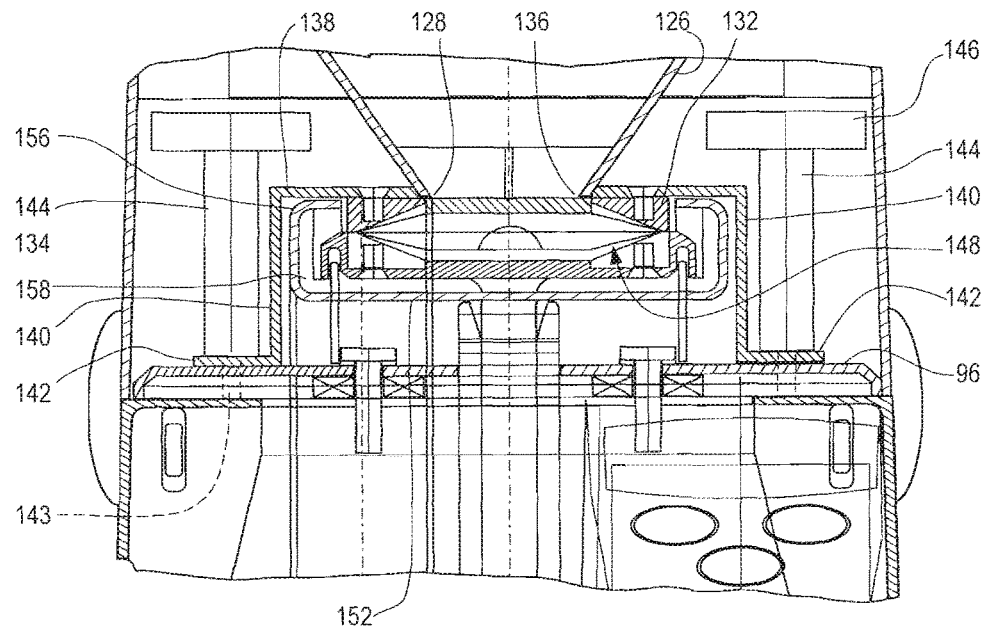
FIG. 3A is an enlarged portion of the sectional front elevation view of FIG. 3.

Referring also to FIGS. 3, 3A, 4 and 4A, located beneath the removable ingredient hopper outlet 128 is a toolessly removable grinding assembly 130. The grinding assembly 130 includes a fixed grinder assembly 132 with a mounting table 138 located immediately beneath the removable ingredient hopper assembly 56. As best seen in FIGS. 3A and 4A, the fixed grinder assembly 132 does not move during the grinding operation or during adjustment of the grind setting and is tooless-manually releasably attached to the frame member in a fixed operative location beneath the hopper assembly 56. The fixed grinder 132 has a fixed grinding burr 134 with a fixed burr opening 136 that aligns with an opening in the table 138. The opening 136 and the aligned opening in the table 138 are both aligned with the hopper outlet opening 128 through which ingredient from the hopper outlet 128 is received. The fixed grinding burr 134 is attached to the underside of the table 138 and has a downwardly extending, downwardly facing, annular, truncated conical grinding surface that surrounds the fixed burr opening 136.

The fixed grinding burr 134 is preferably attached beneath fixed burr mounting table 138 by a plurality of substantially identical magnetic pins 139 that extend into upward facing mating holes in the top of the burr 134 and through aligned fastener openings in the mounting table. The magnetic pins 139 have handles 141, FIG. 4A, extending sufficiently above the top of the mounting table 138 to enable them to be manually pulled out of their mounting hole without the use of tools. Alternatively, the magnetic pins 139 are replaced by threaded fasteners with laterally extending handles at the top, like those on commonly known wing-nuts to enable manual rotation of the threaded fasteners without the use of tools. This releasable attachment of the fixed grinding burr 134 to the burr mounting table 138 enables easy replacement of the fixed grinding burr 134 when it becomes worn.

The mounting table 138 is supported above the horizontal frame member 96 by a pair of vertical, rectangular legs 140 extending downwardly from opposite sides of the top of the mounting table 138. The bottom ends of the legs 140, in turn, are supported by a pair of outwardly extending, horizontal foot members 142.

The horizontal foot members 142 are toolessly releasably attached to the top of the horizontal frame member 96 by means of a pair of manually actuatable fasteners 144. The bottom ends of the manually actuatable fasteners 144 pass through mating holes in the foot members 142 and into releasably locked engagement with mating female fasteners 143 carried by the horizontal frame member 96. The mating female fasteners are preferably threaded bores for receiving threaded male members located at the bottoms of the manually actuatable fasteners 144. Alternatively, rotatable interlocks within the bores interlock with a mating interlocking member at the bottom ends of the manually actuatable fasteners 144. The fasteners 144 have elongate, relatively narrow bodies with handles 146 that are relatively wider to provide a mechanical advantage facilitate manual rotation of the manually actuatable fasteners 144 without the use of any tools. In order to remove the mounting table 138, all that is needed is to first toolessly remove the hopper assembly 148 and then manually rotate the fasteners 144 to an unfastened position. The mounting table 138 with the fixed grinding burr 134 attached is then simply, manually lifted off the horizontal frame member 96. The magnetic pins 139 may then be pulled out of engagement with the fixed grinding burr 134 and the fixed grinding burr may then be toolessly removed and a new grinding burr toolessly installed. The mounting table 138 may then be toolessly reattached to the horizontal frame member 96.

Referring also to FIG. 12, located beneath the fixed grinding assembly 132 is a rotary grinder assembly, or rotary grinder, 148. The rotary grinder 148 includes an upwardly facing, annular, truncated conical, rotatable grinding burr 150. The rotary grinding burr 150 may be substantially identical to the fixed grinding burr 138 and is fastened to the top of a rotary mounting plate 149 by means of magnetic mounting pins 155 substantially in the same way the magnetic pins 139 with handles 141 fasten the fixed grinding burr to the mounting table 138. Alternatively, threaded members with handles are used to toolessly attach the rotary grinding burr 150 to the rotary mounting plate 149.

The rotary mounting plate 149 is centrally supported at the top end of, and is preferably integrally formed with, an elongate rotary drive member 151. Adjacent the rotatable grinding burr 150 and near the top of the drive member 151 is an outwardly radiating releasable male locking member 153.

Referring also to FIG. 10, the rotary drive member 51 is tooless-manually, releasably linked to a hollow, cylindrical, drive shaft 152 of an electrical rotary motor 154. The motor 154 is releasably, toolessly attached to the upper frame member 96 by means of threaded fasteners 157. The fasteners 157 pass through shock absorbing pads 159 that isolate vibrations of the motor 154 from the top frame member 96 and the hopper assembly 148 mounted thereon.

The rotary drive member 151 is slidably received within the hollow drive shaft 152 until the male locking member 153 is slidably received in a mating locking slot 155 at the top of the drive shaft 152, as shown in FIGS. 4 and 4A. With the locking member 153 within the slot 155, the rotary drive member 151 is constrained to rotate with rotation of the hollow drive shaft 152. When energized, the electrical rotary motor 154 rotatably drives the hollow rotary drive shaft 152 which, in turn, rotates the rotary drive member 151. The drive member 151, in turn, rotates the mounting plate 149.

FIG. 12, and the rotatable grinding burr 150 while in mating, grinding relationship with the fixed grinding burr 134.

Referring now to FIGS. 3, 4 and 11, the relative position of the rotary grinding burr 150 and the fixed grinding burr 132, or spacing between the grinding burrs that determines the fineness of the grind, is determined by the position of a stepper motor assembly 166. The stepper motor assembly 166 includes a stepper motor 168 that is mounted to the bottom 170 of the drive motor 154 by a rotatable cradle mount 172. The stepper motor 168 has a vertical reciprocal drive member 174 with an end support 176 upon which the bottom end 177 of the drive member 151, FIG. 12 is supported. The end 177 protrudes slightly from the bottom of the hollow drive shaft 152, is rotatably mounted to the drive member 177 and has a semispherical recess 61 within which a matching semispherical ball 179, FIG. 4, at the end of the reciprocal drive member 174 is received. This support without attachment is preferred for it allows the rotary burr 150 to be toolessly removed and replace simply by lifting the drive member 151 out of the hollow drive shaft 152 after the fixed burr mounting table is toolessly removed.

When the stepper motor 168 is energized, the reciprocal drive member 174 is caused to either slidably move upwardly or downwardly within the hollow drive member 152 depending upon the direction in which the stepper motor 168 driven. If the movement is upward, the movable, rotary grinding burr 150 is moved upwardly and closer to the fixed grinding burr 130 for a relatively finer grind. If the movement is downward, the movable, rotary grinding burr 150 is moved downwardly away from the fixed grinding burr 130 for a relatively coarser grind. A stepper motor position sensor 212, FIG. 212, associated with the stepper motor 168 provides an indication of the position of the reciprocal drive member 174 relative to the body of the stepper motor 168. Alternatively, or additionally, the position is determined by electronically counting the number of steps the stepper motor 168 has advanced either forwardly or backwardly from a home position. Alternatively, the stepper 168 is replaced with a solenoid, servo motor or any other electromechanical device that can be suitably employed to raise and lower the rotary burr 150.

Referring also to FIGS. 13, 14 and 15, the ingredient 54, while being ground, is temporarily contained within a toolessly removable manifold assembly, or grinding chamber assembly, 156. The grinding chamber assembly 156 has an upper cylindrical side wall 160 defining a grind chamber 158 protectively surrounding the annular fixed grinding burr 132 and the rotary grinding burr 150 when in mating, grinding relationship. A relatively narrower cylindrical base 164 supports the grind chamber 158 above the top, horizontal, frame member 96. The base 164 has a circular bottom 162 that rests upon and is toolessly supported by the horizontal frame member 96. As seen in FIG. 13, the bottom 162 has an opening for receipt of the driven rotary member 151 of the rotary grinding assembly 148. The chute 62 extends radially outwardly from the cylindrical sidewall 160 and communicates with the interior of the manifold body 158 for passing ground ingredient 55 from within the manifold body 158 to the outlet 64 above the bag location. The top of the rotary drive member 152 is protectively contained within the base 164.

Figure 5:
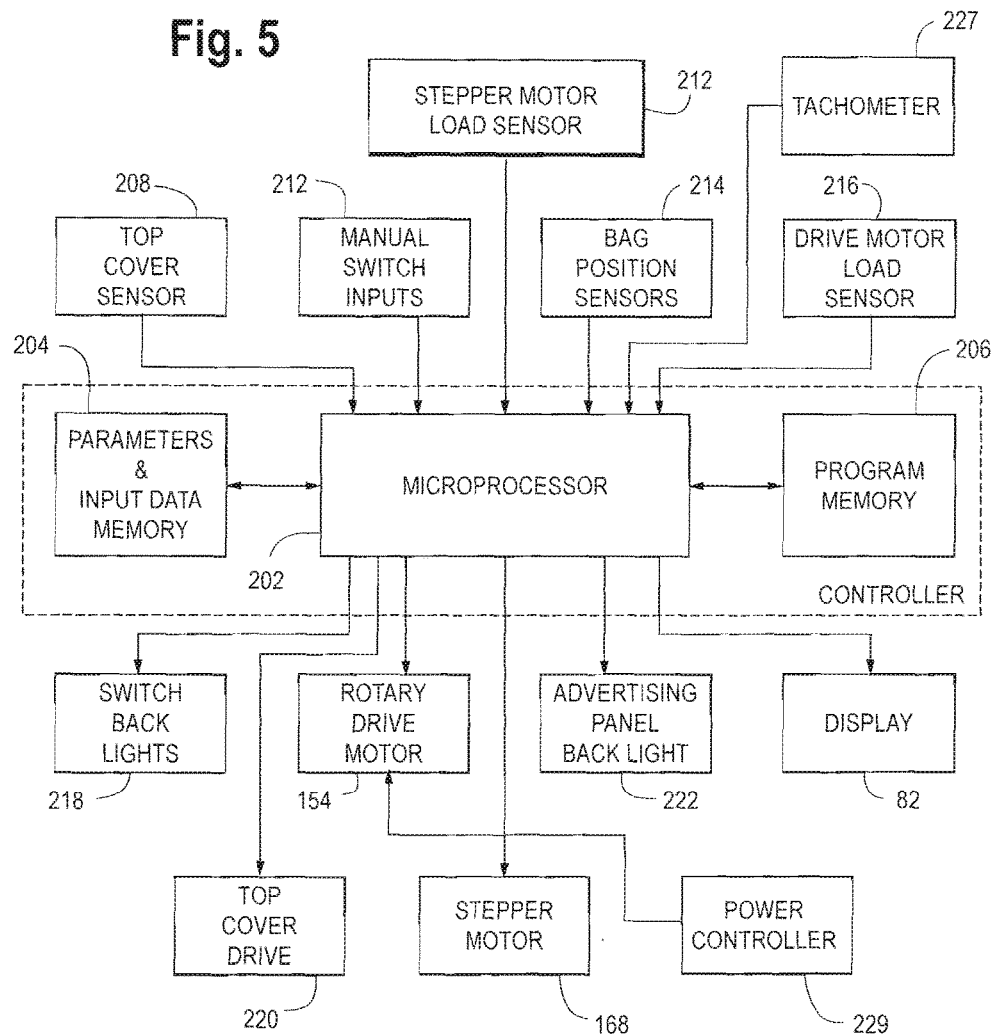
FIG. 5 is a functional block diagram of the grinder assembly of FIGS. 1-4.

Referring now to FIG. 5, the grinding assembly 30 of the present invention is automatically controlled by means of a controller 200 having a microprocessor 202 operating in conjunction with a parameter and input data memory 204 and a program memory 206. The microprocessor 202 has inputs from the top cover sensor 208, the manual switch inputs 210, from the stepper motor position sensor 212, bag position sensor inputs 214 and from the drive motor load sensor inputs 216. The top cover sensor 208 is any suitable detector, such as a limit switch or a magnetic sensor switch responsive to the position of the cover 57, FIG. 2, or to the position of the pusher member 67 or to the drive position of the electromechanical device 65, that provides an indication of when the lid 57 is in a closed position, as shown in FIG. 8, or in an open position, as shown in FIG. 7. The manual switch inputs 212 are from the switches 84, 86 and 88 of FIG. 1. The stepper motor position sensor 212 senses the position of the stepper motor, and thus the relative position of the movable grinding burr and the fixed grinding burr. The bag position sensors inputs 214 are from the bag sensors 81 and 83, FIG. 1, and indicate whether or not a bag is in correct position to receive ground ingredient.

Figure 5A:
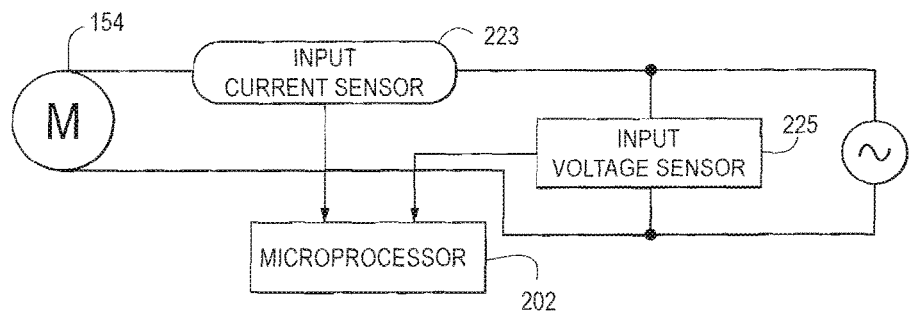
FIG. 5A is a circuit block diagram of a circuit for monitoring the input power to the drive motor of the grinder of FIGS. 1-4.

The drive motor load sensor 216 is electronic sensor that responds to the changes in input electrical power to determine when the entire amount of the ingredient has been ground and there is no longer ingredient between the grinding burrs. The electrical input power is determined by the microprocessor controller 202 from inputs from an input current sensor 223 and an input voltage sensor 225, FIG. 5A.

The microprocessor controller 202, in addition to responding to a decrease in input power to determine when grinding is completed, the microprocessor controller also responds to a tachometer 227. The tachometer senses the rotational speed of the drive motor 154 and the controller 202 increases input power when a momentary decrease in rotational speed occurs beneath a preselected minimum, such as one thousand revolutions per minute. Such a reduction in speed may occur when the grinder motor meets with a larger than usual output load. When such a decrease in speed occurs, the controller 202 increase the input power being provided to the drive motor 154 by a power controller 229 to help the drive motor 154 regain and maintain the preselected rotary speed. The controller 202 may also respond to a decrease in speed or the rotary drive motor to increase the time period of a maximum grind time clock period, FIG. 6B, to allow a longer period of time to complete the grinding operation.

The controller 200 responds to these inputs to control various elements of the grinder assembly 30 in accordance with the logic flow chart of FIGS. 6A and 6B, as describe below. Generally, the controller responds to the manual switch inputs to actuate switch back lights 218 indicating the status of the switches or the grinder in general. Likewise, the controller controls the display 82 to communicate status and information needed for setting parameters or otherwise programming or operating the grinder assembly 30. A top cover drive 220 receives output signals from the controller 200 to selectively energize the automatic opener opening and closing the lid 57. An advertising panel back light 222 is selectively lit under control of the microprocessor 202. Interface circuits (not shown), as needed, are provided between the microprocessor 202 and the various input and output devices.

Referring to FIG. 5, as noted above, in keeping with one aspect of the invention, instead of establishing different preselected time durations for the grinder to operated before the drive motor is turned off, in keeping with the present invention, the grinding is stopped when the microprocessor controller 202 senses that the input power to the drive motor 154 has dropped to a preselected level indicating that it is no longer working against a load of ingredient being ground and the grind chamber is empty. An input current sensor 223 provides to the microprocessor 202 an indication of the input current being provided to the rotary drive motor 154 and an input voltage sensor 225 provides to the microprocessor 202 an indication of the input voltage being provided to the rotary drive motor 154, and from these indications, the microprocessor 202 calculates the input power. The input current sensor 223 and the input voltage sensor 225 may be associated with the input power controller 229. Instead of the input voltage sensor 225 being provided, the input voltage may be assumed to remain constant at standard line voltage, and the calculation of input power is based on the measured input current and this assumption of input voltage.

The level of reduced power that corresponds to a an empty grind chamber is empirically determined, and when the input power falls beneath this level, the input power controller 229 is caused to terminate input power to the rotary drive motor automatically. A backup timer associated with the controller 202 may also shut off power to the rotary drive motor 154 after a preselected maximum time period in the event the power is not automatically terminated in response to a decrease in input power to the drive motor.

Figure 6A:
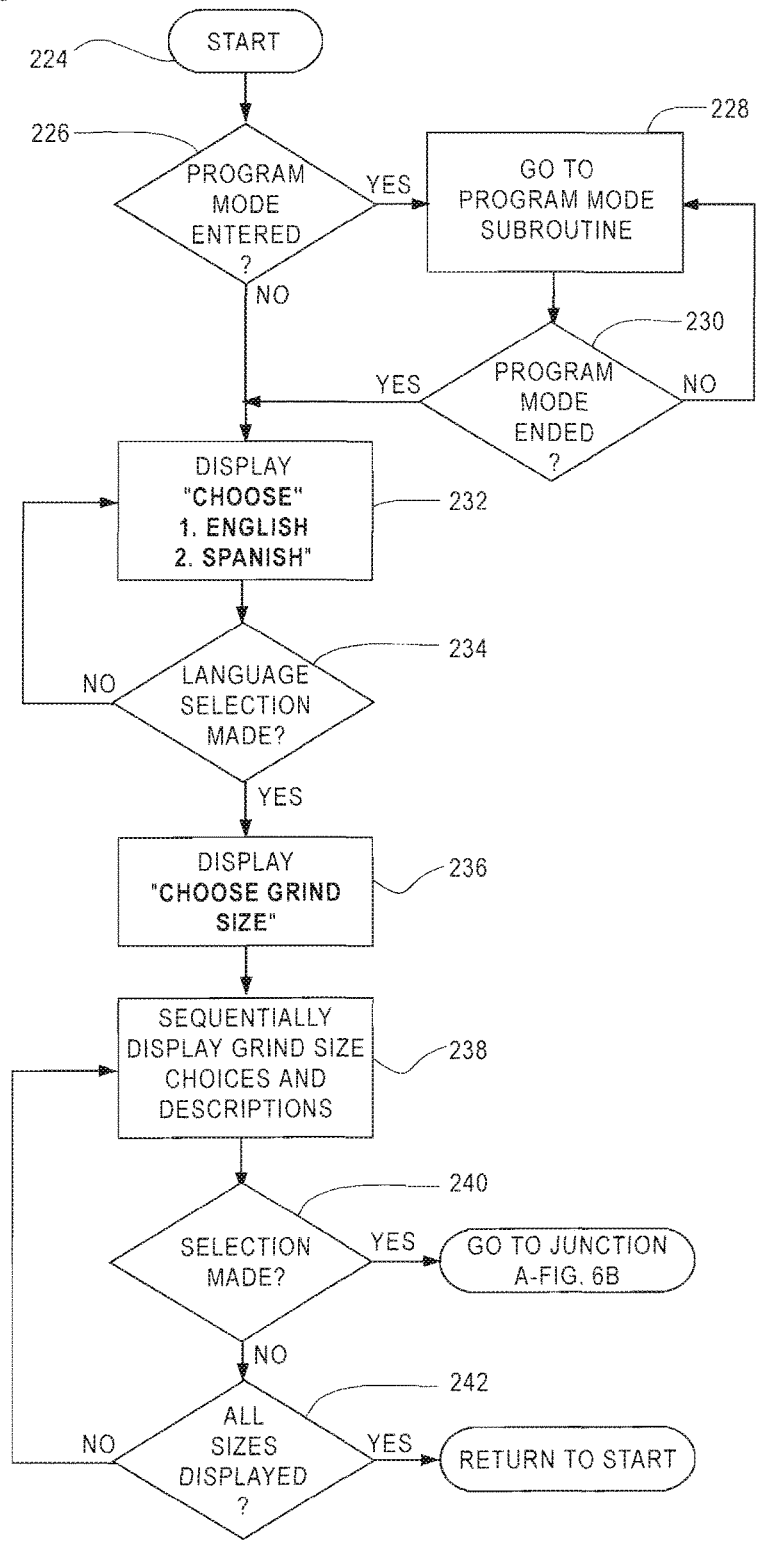
FIGS. 6A and 6B from a composite logic flow diagram of the preferred mode of operation of the grinder assembly of FIGS. 1-5.
Figure 6B:
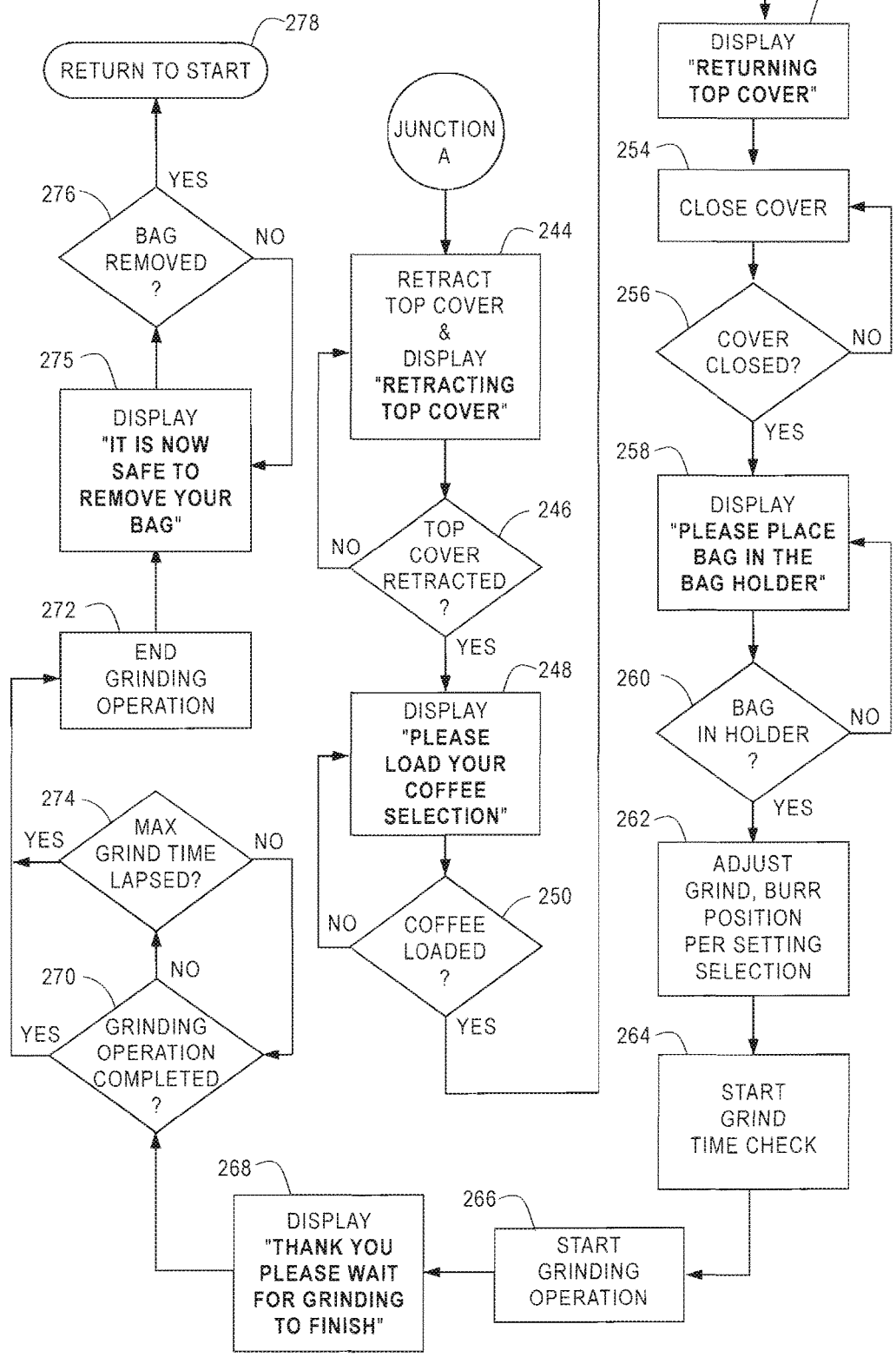

Referring now to FIGS. 6A and 6B, the microprocessor 202 preferably operates with software in accordance with the logic flow chart, shown. After startup at step 224, in step 226, it is determined whether the program mode has been entered in step 226. If the program mode has been entered, then program proceeds to a program mode subroutine 228 in which various parameters may be entered into the parameter and input data memory 204. If the program mode is ended, or has timed out due to lack of an input command, then in step 230 the program moves to step 232. In step 232, the display 82 shows a message requesting the user to select a language. After a language selection is made in step 234, the display is caused to display a message requesting the user to choose a grind size or grind setting in step 236. Then in step 238, a plurality of grind sized choices and descriptions are displayed sequentially. If a selection is made in step 240, then the program proceeds to Junction A of FIG. 6B. If not, but all sizes have been displayed, then in step 242, the program returns to start 224.

Referring now to FIG. 6B, Junction A proceeds to step 244 in which the top cover 57 is retracted, or opened, as shown in FIG. 7, as the display shows the message "RETRACTING TOP COVER". After it is determined that the top cover 57 has been fully retracted in step 246, in step 248 the display 82 is caused to show the message "PLEASE LOAD YOUR COFFEE SELECTION". After it is determined that the coffee has been loaded in step 250, either by the user actuating one of the switches 84, 86 or 88, or by a strain gage or other sensor that detects the presence of a minimum amount of coffee within the hopper, then in step 252 the display shows the message "RETURNING TOP COVER" while in step 254 the cover is automatically closed by de-energizing the automatic opener.

Once it is detected that the cover is fully closed in step 256, in step 258, the display is cause to show the message "PLEASE PLACE BAG IN THE BAG HOLDER". After the user places the bag in position and it is detected to be in position in step 260, as indicated by the bag position sensor inputs 214 from the sensors 81 and 83, in step 262 the stepper motor 168 is actuated to adjust the relative grinding burr position according to the grind setting that was selected during step 240. After the adjustment has been made, in step 264 a grind clock is started to time the period of grinding and in step 266 the grinding operation is started by energizing the rotary drive motor 154. The grind clock is internal to the microprocessor 202 and provides an elapsed time indication. During the grinding operation, the display shows the message, "THANK YOU. PLEASE WAIT FOR GRINDING TO FINISH".

If in step 270, it is determined that he grinding operation is completed, as indicated drive motor load sensor 216, then the grinding operation is ended in step 272. If not, but it is determined in step 274 that the maximum grind time, as measured by the grind time clock 264, has lapsed, then again the program proceeds to step 272 to end the grinding operation. Since finer grinds generally take longer than coarser grinds, a potentially different maximum grind time for each of the different grind settings may be stored in a the parameter and input data memory. After step 272, in step 275, the message "IT IS NOW SAFE TO REMOVE YOUR BAG" is shown to the user who may then remove the bag. Once it is determined that the bag has been removed in step 276, in step 278, the program returns to start 224, FIG. 6A.

Referring now to FIGS. 16-21, a group of embodiments of a self calibrating coarseness controllable grinding mechanisms that may be used in the grinders shown above in FIGS. 1-16 (or modifications thereof to enable use of a drive motor that is arranged horizontally) are shown and described below. Instead of a hollow drive shaft with a control shaft being used to control gap size, a longitudinally movable axle of a movable rotor electrical motor is employed to move the rotating grinding burr. This can be done even while being rotating grinding burr is being rotated. These schematic drawing figures are simplified relative to drawing FIGS. 1-4C and 10. Only the grinding mechanisms and hopper are shown. Not all the parts of a complete grinder are shown for purposes of simplicity of explanation and clarity of view. Only the coarseness controllable grinding mechanism defined in part by the drive motor, grinding burrs and the gap adjustment mechanism, or device, are shown, but it should be appreciated that all the other elements and control features of an entire grinder, as shown in these earlier drawing figures and described above, are also included in these embodiments.

Likewise, the same control system described above with respect to FIGS. 5-6B may be used with the embodiments of FIGS. 16-22 with only a few alterations described below with respect to FIGS. 24 and 25. Also, in lieu of drive motor load sensor 216 described in detail with reference to FIG. 5A, a vibration or acoustical sensor 327 may be employed to sense changes in vibration or sound generated by the grinder either when the grinder drive motor losses the grinding load at the end of a grinding operation or when the drive motor is temporarily stalled for purposes of calibration, as described below. Further details concerning the sensor 327 may be found in U.S. patent application Ser. No. 13/354,167 filed Jul. 13, 2012 and entitled "Food Grinder with Automatic Controller and Method", which is hereby incorporated by reference.

The coarseness controllable grinding mechanism 299 of FIG. 16 is seen to include a vertically aligned adjustable rotor motor 300 that is used as the electrical drive motor instead of the drive motor 154 with the hollow drive shaft 152 of the earlier embodiment. The adjustable rotor motor 300 does not need a hollow motor axle to contain a longitudinally adjustable drive member 151. Instead, the adjustable rotor motor 300 is designed to allow the rotor 302 and a fixedly attached, solid axle 304 to slidably move longitudinally in the elongate direction of the axle 304 relative to a fixed stator winding 305 and motor frame 306.

A motor, such as the 1934 or 1935, Model 1692 FET1 and 1692 FET2 motors, made by FIR-Elettromeccanica-S-R-L, or FIR Group/Kinetek has been found to work successfully, but other makes and models with different specifications could also probably be used as the movable rotary motor 300. When energized, the adjustable rotor motor 300 causes the adjustable rotor 302 and the attached axle 304 to rotate at approximately 1780 rpm. Preferably, the power is not less than one horse power. The length of the motor is approximately 9.75-inches; the diameter is approximately 5.31-inches and the rotor has a degree of movement of approximately ⅜-inch.

The slidable movable axle 304 has a pair of opposite ends 308 and 310 that are accessible outside of opposite ends lower and upper ends of the motor frame. An upwardly facing, rotary grinding burr 312 is attached to the upper end 310 and rotates with rotation of the axle. The rotating grinding burr is located opposite of and spaced from the fixed grinding burr 314 by a variable grinding gap. As in the above embodiment, the downwardly facing, fixed grinding burr is preferably fixedly attached against movement within a grinding chamber 316. The grinding chamber 316 is only schematically illustrated, but it should be appreciated that the actual grinding chamber is substantially like that shown as part of the toolessly removable grinding assembly 130 of FIGS. 3-4. Likewise, unground food ingredient in an ingredient hopper 318 like hopper assembly 156, above, is passed to the grinding chamber 316 by means of a gravity feed from above and is expelled laterally in the direction of arrow 320 and then down the cute 62, all as shown and explained above with respect to FIGS. 1-4C, above. A controllable electromechanical device 322 is engaged with the bottom end 308 of the slidably movable motor axle for selectively, longitudinally moving the motor axle 3004 relative to the motor frame 306 and the stator to selectively adjust the grinding gap.

In the embodiment of FIG. 16, the electromechanical device 322 includes a stepper motor 324 which may be like the stepper motor 168, above, and having a rotary output axle 326 carrying an external helical thread that is threaded into mating internally threaded bore contained within a pusher bearing support member 328. The top of the bearing support member 328 opposite the threaded axle 326 supports a thrust bearing 330. The thrust bearing 330, in turn, provides underlying support rotary support for the bottom end 308 of the movable motor axle 304 that permits upward force to be applied to the bottom end 308 of the movable motor axle 304 while allowing rotation of the axle 304 by the movable rotor motor 300.

The stepper motor 324 can be finely controlled by means of digital control inputs. For every two hundred control pulses of one polarity, the stepper motor rotates the threaded axle 326 one complete revolution in one direction, and for every two hundred control pulses of an opposite polarity, the stepper motor rotates the threaded axle 326 one radial degree in the opposite direction. If the threaded axle has twenty-five threads per inch, then the finest adjustment obtainable is 0.025-in×0.04 rev./in=0.001 inch. Using a stepper motor that requires more control pulses per inch or a threaded member with more threads per inch will increase the fineness of the adjustments to gap size that can be obtained The bearing support member is mounted for sliding movement only within a noncircular control mechanism housing 332. Whenever the threaded axle is rotated in one direction, the bearing support member 328, and thus, the thrust bearing 330 and the movable drive motor axle 304 slide upwardly to move the opposite top end 310 of the rotary drive axle 304 and the attached rotary grinding burr 312 to move closer to the fixed grinding burr 314 to lessen the grinding gap. Likewise, when the threaded stepper motor axle 326 is rotated in a direction opposite to the one direction, the movable axle 304 moves downwardly. When the movable axle moves downwardly the grinding gap is lessened, with the thrust bearing 330 fastened against removal from the bearing support member 328, the downward movement of the bearing support member 328 pulls the end 308 downwardly but the downward force of the weight of the axle 304, the rotary grinding burr 312 and the rotor 302 assists in this downward movement.

Figure 17:
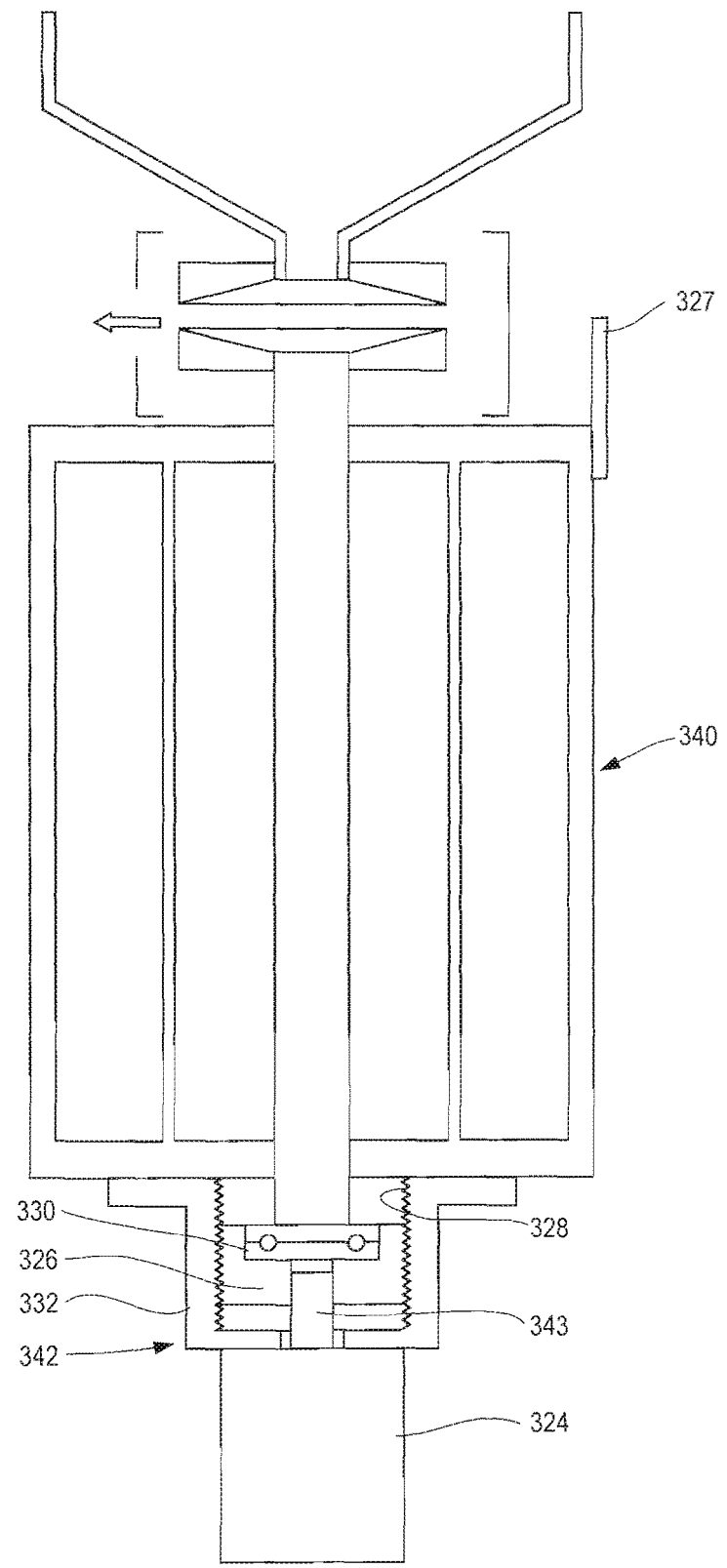
FIG. 17 is a simplified drawing of another of another embodiment of the grinder in which the rotating burr is connected to the top end of the drive shaft of an electrical motor with a rotor that is longitudinally, slidably, movable relative to the stator, or an adjustable or slidable rotor motor, and is selectively moved by means of a stepper motor rotating a threaded member mated with a slidable but non-rotatable adjustment block to adjust the burr gap.

Referring to FIG. 17, another embodiment 340 of the coarseness controllable grinding mechanism of the present invention is seen to be substantially identical to that of the mechanism 299 of FIG. 17. The only parts that differ from that of FIG. 16 are those that compose the controllable electromechanical device 342. Instead of an eternally threaded output drive axle 326 and a slidably mounted bearing support member 328, the axle 343 of the stepper motor 324 is attached to and rotates an externally threaded bearing support member 326. The bearing support member 326 is threaded into a mating internally threaded bore 328 of a cylindrical control mechanism housing 330. When the stepper motor 324 rotates in one direction, the rotating bearing support member 326 threadably moves upwardly toward the bottom of the motor 300 to shorten the grinding gap. When the stepper motor 324 rotates in a direction opposite to the one direction, then the thrust bearing 330 and end 308 of the drive axle are lowered to increase the gap. Again when the grinding gap is being lessened, the axle 304 and rotor 302 are pushed upwardly by the upward movement of the bearing support member 326 and pulled downwardly when the grinding gap is being increased.

Thus, in the mating threaded embodiment of FIG. 17 and the embodiment of FIG. 17, the drive motor 300 and the controllable electromechanical devices 322 and 342 would not require any spring biasing if lain horizontally instead of vertically, as may be required in the case of pure sliding movement without the presence of mating threaded members, as will be shown in subsequent embodiments described below.

Figure 18:
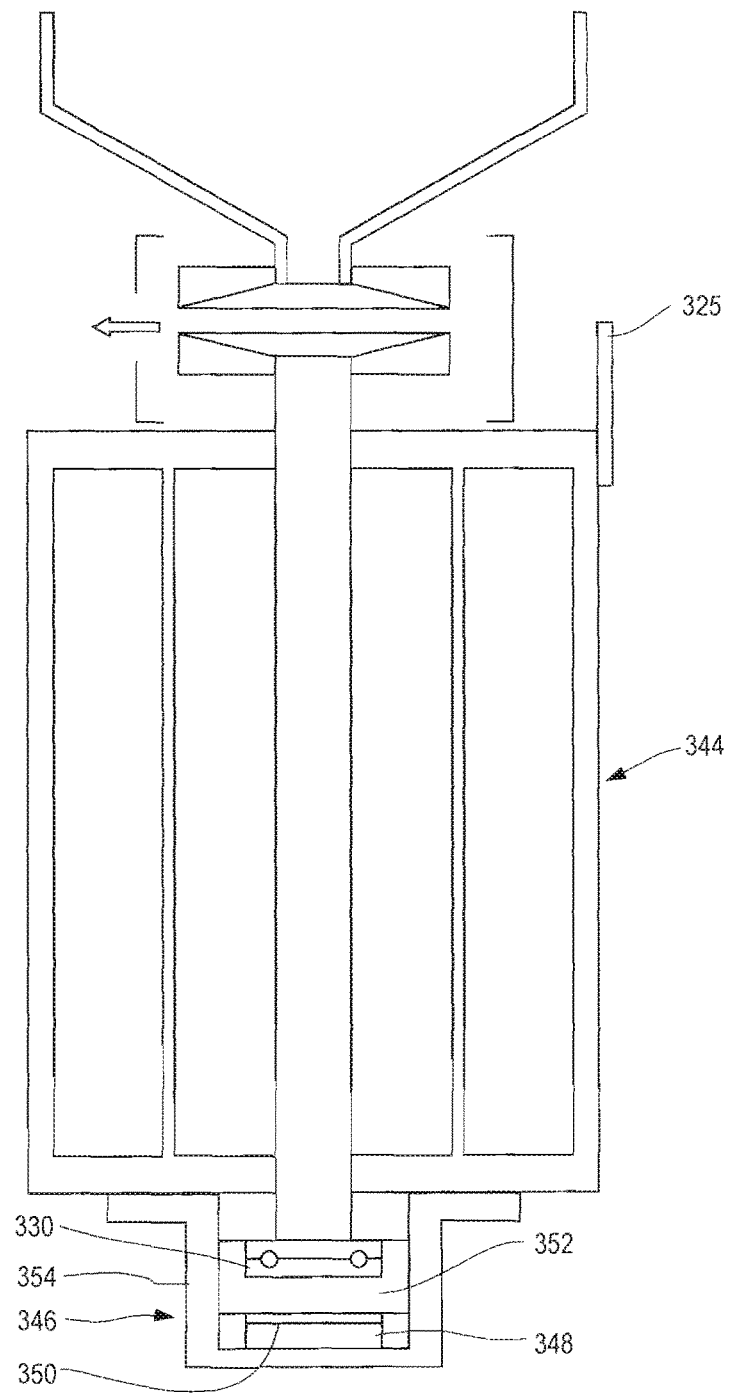
FIG. 18 is a simplified drawing of yet another embodiment of the grinder in which the rotating burr is connected to the top end of a drive shaft of a slidable rotor motor like that of FIG. 16, and is selectively, adjustably moved by means of a stepper motor rotating an adjustment block threadably, adjustably fastened to a housing attached to the back of the frame of the electrical, slidable motor rotor.

Referring now to FIG. 18, another embodiment 344 is shown which is substantially like those of FIGS. 16 and 17 but in which changes have been made to the controllable electromechanical device 346. Unlike the electromechanical devises 322 and 342, which use a stepper motor 324 for driving the electromechanical device, in the current electromechanical device the stepper motor has been substituted with a piezoelectric motor 348, or Stepping Piezo Actuator (SPA), such as a SPA30Uxs Piezo Motor made by Group CEDRAT, as described in their specification sheet at www-.cegdrat.com, which is hereby incorporated by reference. As stated there, the SPA operates by accumulation of small steps produced by a sawtooth-like control signal. Between each step, the motor is locked in position without any power consumption. Fine adjustment of the SPA allows nanometer resolution which has linear output motion in the direction of the vertical axis.

The output arm 350 of the piezoelectric motor 348 is attached to a bearing support member 352 that is not threaded but is slidably mounted within the interior of a control mechanism housing 354. The control mechanism housing 354 is attached to the bottom of the motor housing 306 and protectively houses the piezoelectric motor 348, bearing support member 352 and the thrust bearing 330. When the output of the piezoelectric motor 348 pushes upwardly against the bearing support member, the grinding gap is lessened. When the output of the piezoelectric motor 348 moves downwardly, the downward force of the weight of the rotor 302 and the axle 304 causes the axle to follow the bearing support member 352 to slide downwardly to increase the grinding gap.

Referring now to FIG. 29, another embodiment 356 of the coarseness, controllable grinding mechanism in which the drive motor 300 is arraigned horizontally. The unground ingredient in the hopper is moved by a rotary auger 357. The controllable electromechanical device 358 includes an externally threaded, rotatable adjustment member 359 that is threadably mounted within an externally threaded bore extending through a mounting frame 360 attached to the left end of the movable rotor motor 300. Mounted to an inner end of the threaded adjustment member is a thrust bearing 360 which is engaged with the movable axle 304. The opposite end of the threaded adjustment member is attached to a relatively large driven pulley 362 which is connected by a pulley belt 364 to a relatively smaller drive pulley 366. The drive pulley is attached to the rotary output axle 368 of the stepper motor 324. When the stepper motor 324 rotates in one direction, the threaded adjustable member is rotated in one direction that causes it to move laterally to the right.

This movement to the right is resisted by a set of springs 370, such as spring washers, mounted within a spring housing 372 attached to the right end of the motor 300. The springs 370 press against a shoulder in the end 309 and are supported against lateral movement away from the motor 300 by the spring housing 372. The spring 370 may press against the end 309 by means of a thrust bearing such as thrust bearing 360. Because the driven pulley 366 is smaller than the driven pulley 362, it takes more than one revolution of the relatively smaller pulley to achieve one rotation of the relatively larger pulley. Accordingly, the resolution of control achievable by a given stepper motor is increased relative to a drive between the stepper motor and the threaded adjustment member in a one to one ratio as in embodiments of FIGS. 16 and 17. In the present case of FIG. 20, the resolution is improved by a factor of two. The pulley belt is preferably of a non-slip type with a serrated surface that interfaces with like surfaces on the pulleys 362 and 366. Alternatively, a chain lined with chain drivable pulleys is used.

Figure 20:
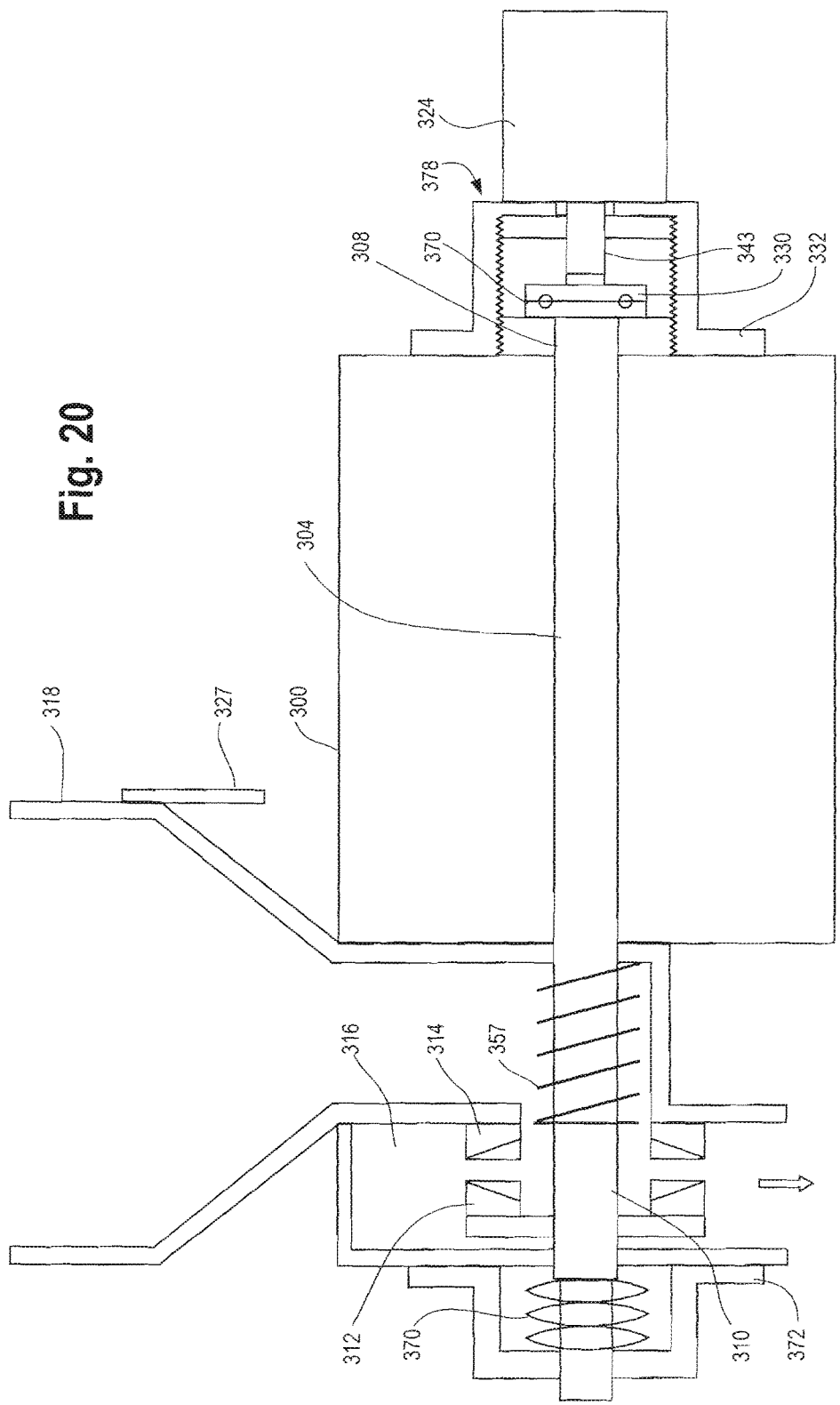
FIG. 20 is a simplified drawing of again another embodiment of the grinder in which the rotating burr is connected to front end of a horizontally aligned slidable rotor motor like those of FIGS. 16-18, but modified with a set of counter springs, and is selectively, adjustably, longitudinally adjusted by means of a rotary stepper motor linked to a threaded adjustment member by means of a pulley linkage.

Referring to FIG. 20, another embodiment 370 of the coarseness controllable grinding mechanism 372 is shown in which the drive motor 300 is aligned horizontally. The set of springs 370 is located at the end 310 adjacent to the grinding burrs 312. The springs 370 bear against a shoulder 374 at one side and against an interior wall of a spring housing 376 attached to the left side of the grinding chamber 316. The other end 308 of the axle is adjusted by means of a controllable electromechanical device 378. The controllable electromechanical device 378 is substantially the same in structure as the electromechanical device 342 of FIG. 17 and operates in the same way as discussed above with respect to the embodiment of FIG. 17.

Figure 19:
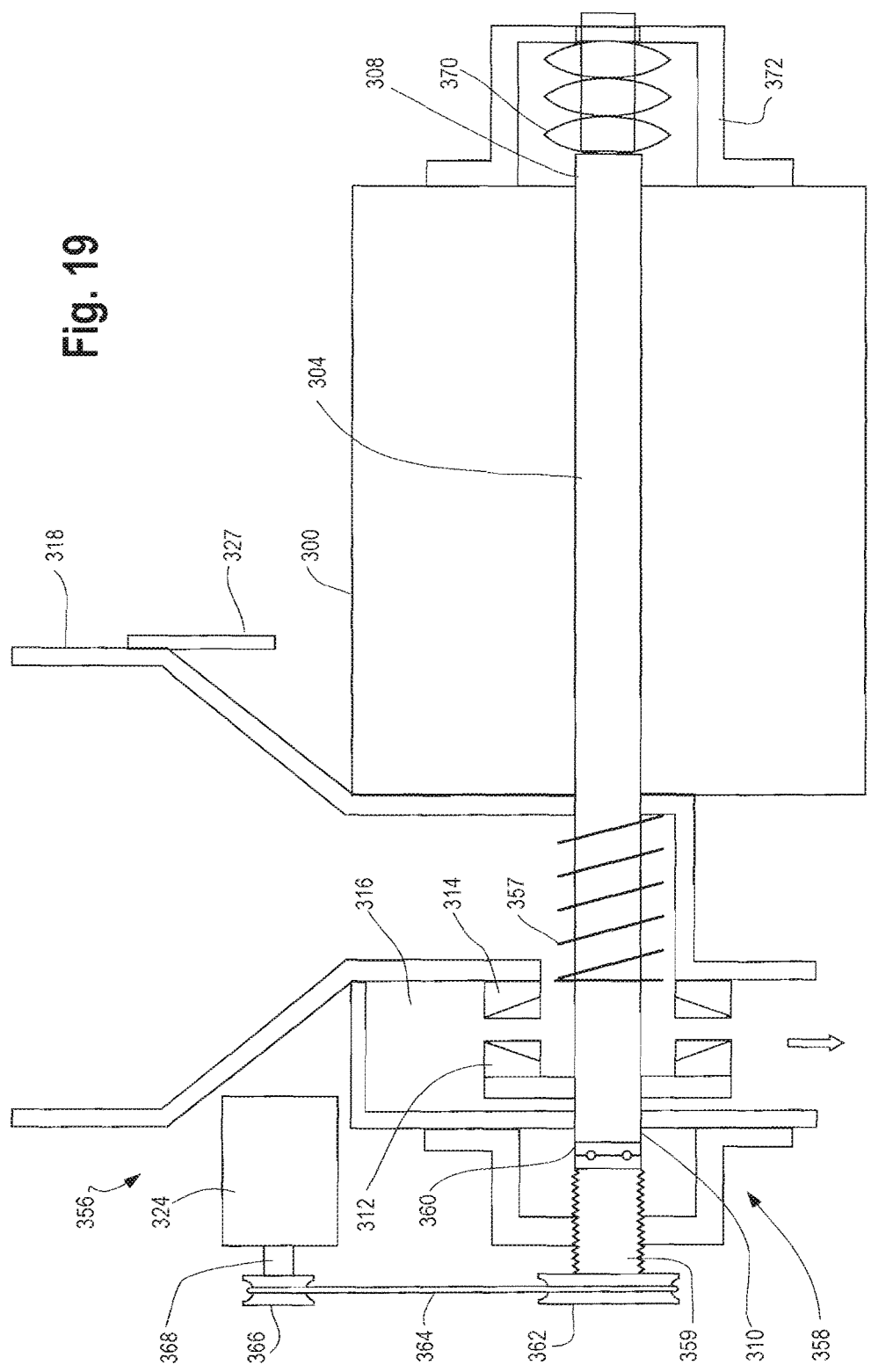
FIG. 19 is a simplified drawing of still another embodiment of the grinder in which the rotating burr is connected to the top end of a drive shaft of a slidable rotor motor like those of FIGS. 17 and 18, and is selectively, adjustable moved by means of a linear piezoelectric motor which selectively, adjustably pushes the back end of the drive shaft.
Figure 21:
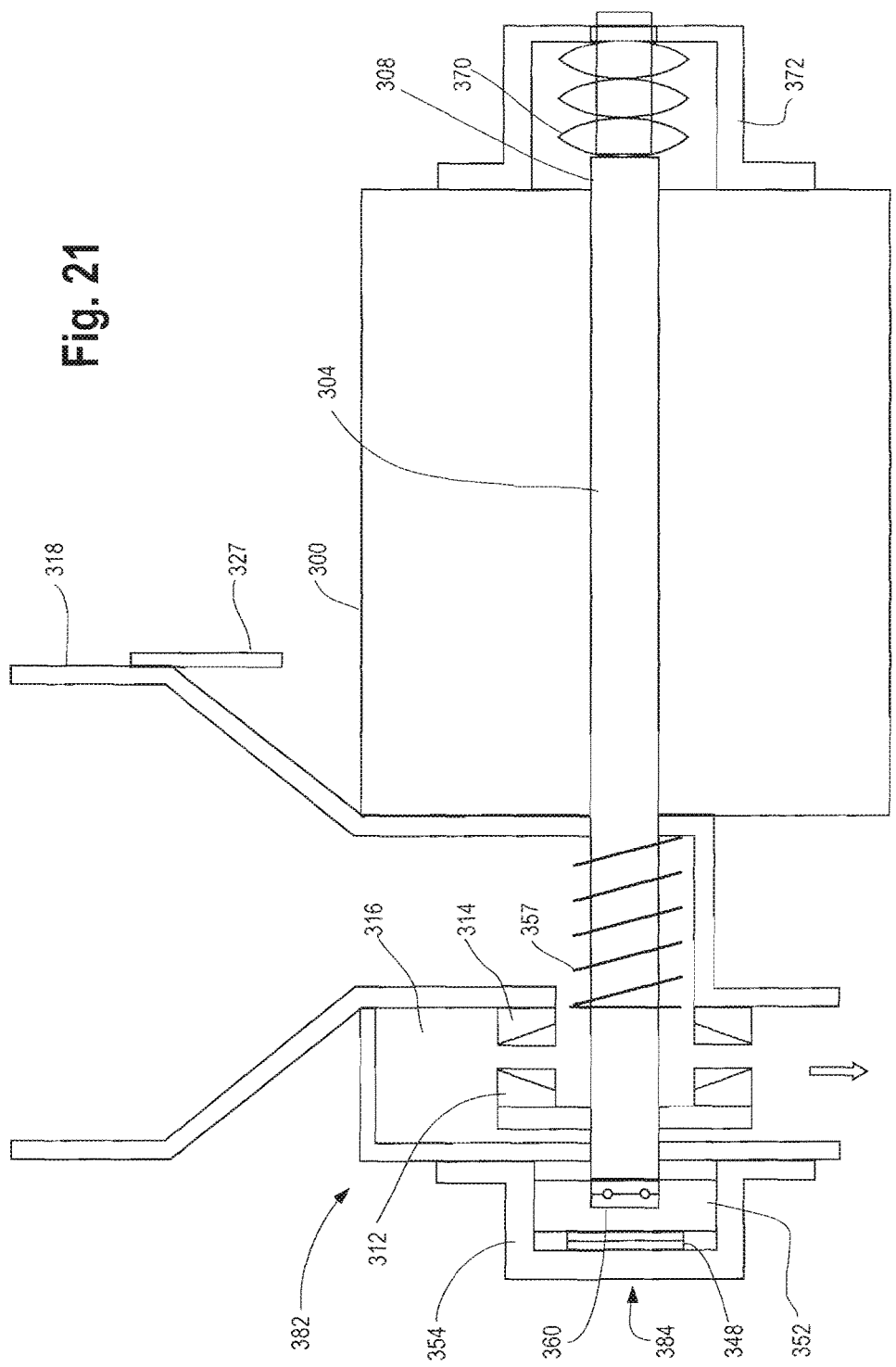
FIG. 21 is a simplified drawing of still, yet, another embodiment of the grinder in which the rotating burr is connected to the front end of a horizontally aligned, slidable rotor motor, like that of FIG. 19, an is selectively, adjustably, longitudinally adjusted by means of a stepper motor rotating a threaded member mated with a slidable but non-rotatable adjustment block to adjust the burr gap, like that in FIG. 17.

Referring to FIG. 21, another embodiment 380 of the coarseness controllable grinding mechanism is shown in which the drive motor is aligned horizontally as in the embodiments of FIGS. 19 and 20. The bias springs 370 are mounted to engage the axle 304 at the end 308 of the movable axle 304 and perform the same spring biasing function as described above with respect to the embodiment of FIG. 19. Alternatively, the bias springs 370 may engage the axle at the same end 310 to which the grinding burrs 312 and 314 are located. Likewise, the controllable electromechanical device 382 employs the piezoelectric motor 348 and is otherwise identical to the electromechanical device 346 of the embodiment of FIG. 18 in structure and operation, as described above with respect to the embodiment of FIG. 18.

Figure 22:
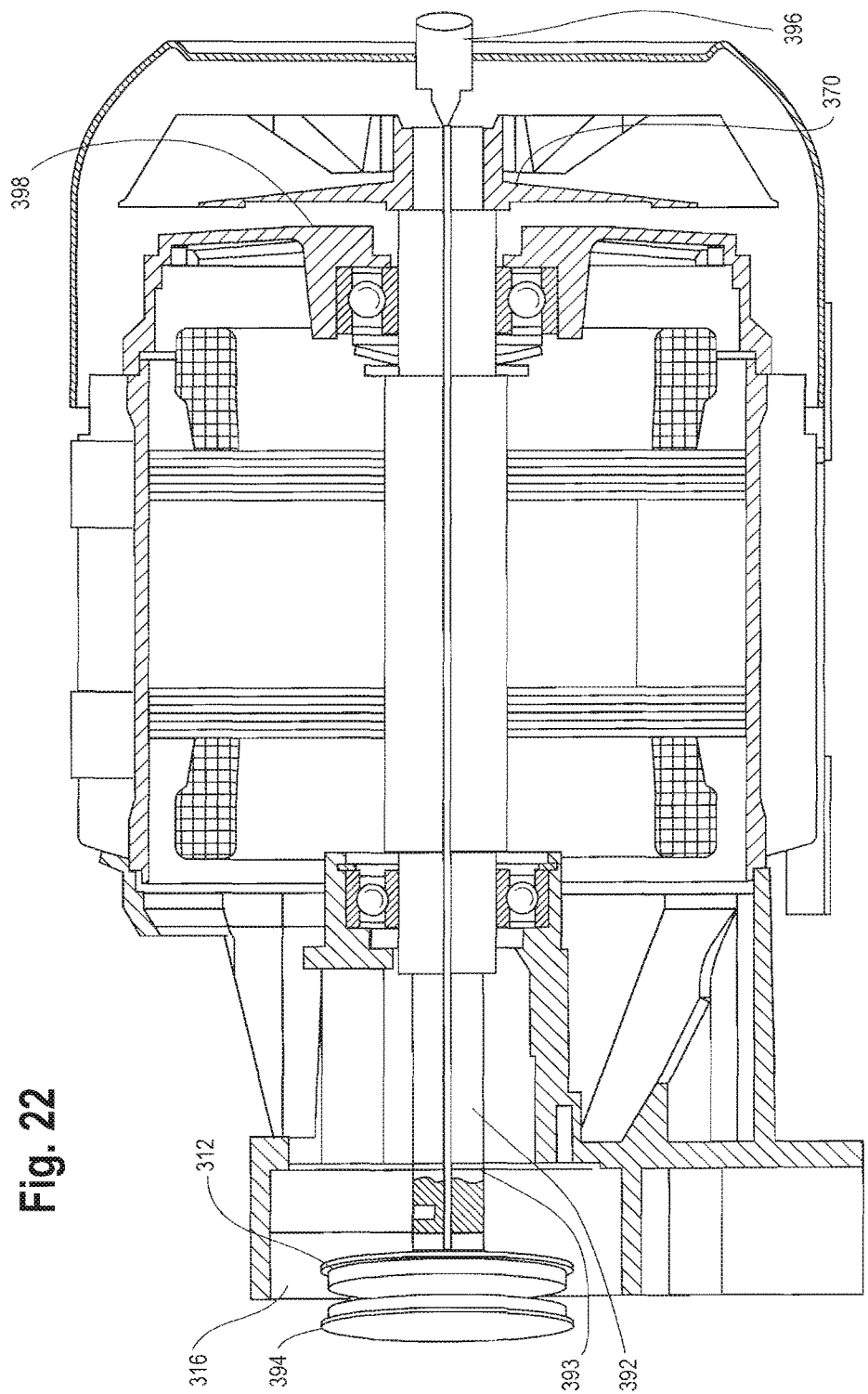
FIG. 22 is a simplified drawing of a further embodiment of the grinder with an adjustment mechanism like that of FIG. 20 but in which the slidable rotor motor is horizontally aligned and is provided with counter springs, as in the embodiments of FIGS. 20 and 22.

Referring now to FIG. 22, another embodiment 390 similar to that of FIGS. 1-15 is shown in which a hollow, rotary drive shaft 392 is attached to the rotary grinding burr 312 and a non-rotary positional control shaft 393 contained within the hollow, rotary drive shaft is attached to a fixed, i.e. a non-rotary grinding burr 394. The opposite end of the control rod is linked to an electromechanical device 396, which is structured and operates identically to any one of the electromechanical devices described above with respect to FIGS. 19-21. Bias spring washers or other bias springs 370 are held between a shoulder of the hollow motor shaft 392 and a frame member 398 and a shoulder formed in the motor drive shaft 392. The bias springs 370 resiliently press the positional control shaft toward the electromechanical device 396. When the positional control shaft is enabled to be moved in a direction toward the electromechanical device 396, the non-rotating grinding burr 394 is moved closer to the rotary grinding burr 312 to reduce the grinding gap between the grinding burrs. When the electromechanical device 396 moves the position control shaft to the left in an opposite direction, the grinding gap between the grinding burrs is decreased.

In accordance with a method of the present invention, the microprocessor 202, FIG. 5 controls the size of the grinding gap in accordance with the program flow chart step 262 of the flow chart of FIG. 6B to adjust the grinding gap per a setting selection. Preferably, the parameters and input data memory 204, FIG. 6, is capable of storing a plurality of different gap sizes associated with a corresponding plurality of different possible selections, respectively. In the case of grinding coffee beans, preferably, there are ten different selectable grinding gap settings. These may be identified to the user either by numbers one through ten, with names of different levels of coarseness, such as VERY FINE", MEDIUM FINE, FINE, REGULAR—COARSE, VERY COARSE, etc. The range of adjustment is determined by the amount of movement is permitted by the particular controllable electromechanical device being used to perform the adjustment and the amount of movement permitted by movable rotor motor 300, when such a motor is used instead of a motor with a hollow drive shaft and positional control shaft. In the case of the movable rotor motor 300, the maximum amount of movement permitted by the motor is approximately ⅜-inch. This is believed to be a sufficiently large range of adjustment for successful operation. In the case of the piezoelectric motor 348, the maximum amount of adjustment is approximately ⅜-inch to ½-inch.

The plurality of different grind coarseness settings are not necessarily divided equally into the maximum range of possible grinding gaps such that they have a linear relationship. For each selectable coarseness setting, the parameters and input data memory 204, FIG. 6, stores a preselected grinding gap size which may be arbitrarily selected although they will generally be kept in decreasing or increasing size relationship.

Figure 23:
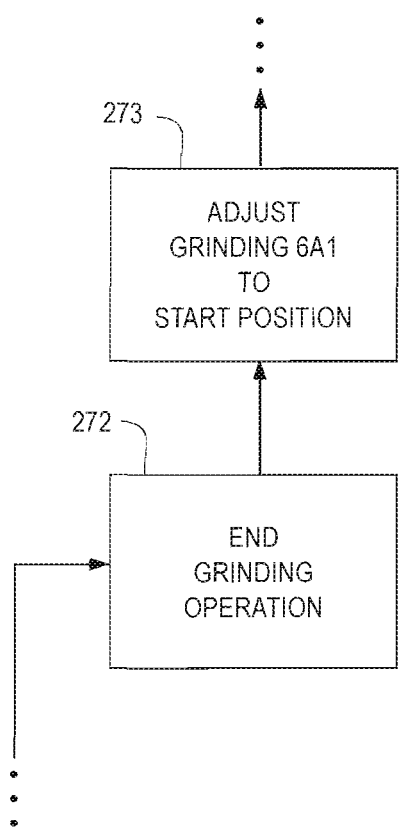
FIG. 23 is a sectional side view of another embodiment of the grinder of the present invention, which unlike those of FIGS. 16-21, in which the a stepper motor is used to control the position of a control rod slidably mounted within a hollow, tubular drive shaft of the grinder drive motor and attached to the fixed grinding burr to adjust its position relative to the rotating grinding burr attached to the hollow drive shaft.

Referring to FIG. 23, after step 272, FIG. 6B, in which the grinding operation is ended, the program moves to a step 273 in which the grinding gap is returned to a start position in which the grinding gap is at its minimum. A minimum gap size of 0.2 mm has been found satisfactory for grinding espresso coffee beans that are finely ground. If espresso grind is selected by the user, then there is no need for adjustment in step 262 and no adjustment is made. If adjustment is needed for a given selection, then adjustment of the grinding gap is measured from the 0.2 mm minimum. For instance, if a gap of 0.6 mm is selected, then the grinding gap is increased by 0.4 mm. in step 262, FIG. 6B.

Figure 24:
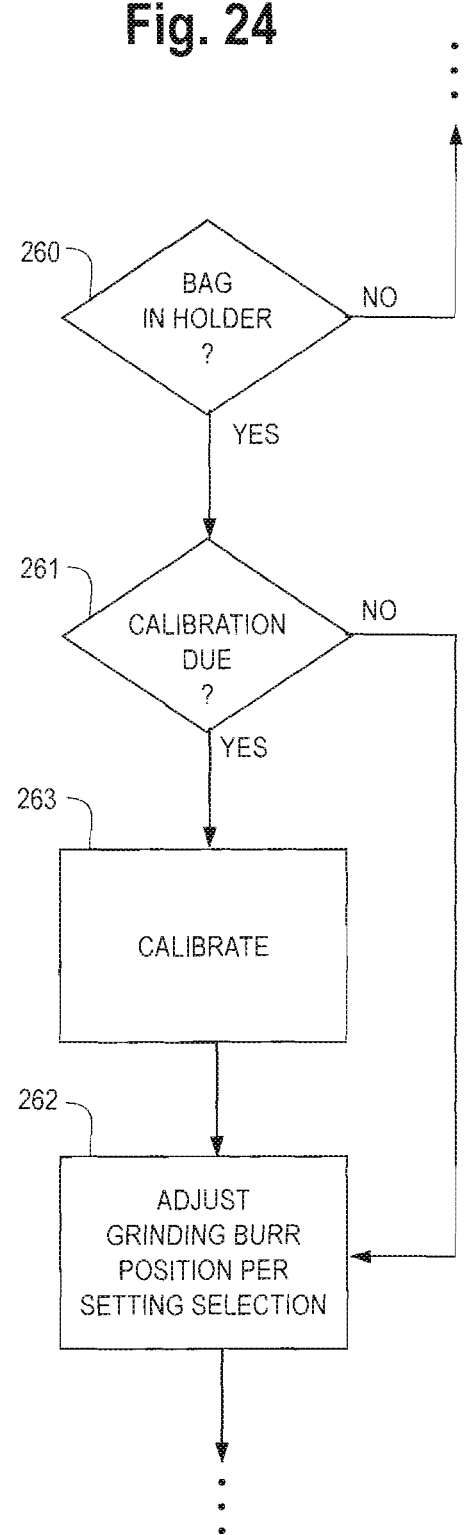
FIG. 24 is a modification of the flow chart of FIGS. 6A and 6B to provide for automatic adjustment of the grinding gap to a minimum start position after conclusion of each grinding operation.
Figure 25:
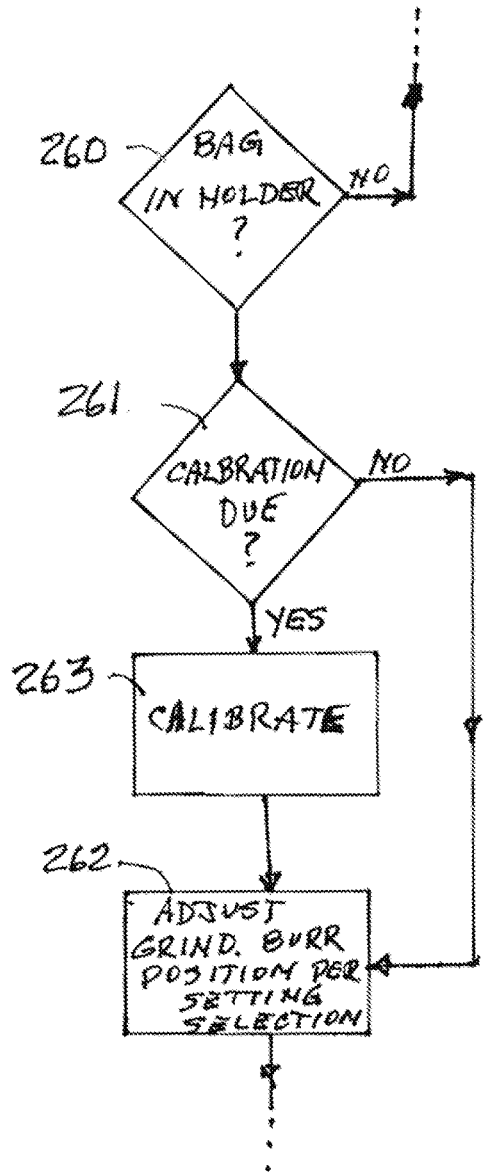
FIG. 25 shows another modification of the flow chart of FIGS. 6A and 6B to provide for the selective step of calibration.

Referring to FIG. 24, the flow chart of FIG. 6B is also altered in accordance with that shown in FIG. 25 to perform a calibration if it is time to perform a calibration. After step 260 is performed and everything is ready for a grinding operation, in step 261 a determination is made as to whether it is time to perform a calibration in step 263. This can be done before each grinding operation or whenever the controller determines that it is time to do so. The determination of when to do so can be based on the number of operation exceeding a preselected number of cycles, the number of hours of operation exceeding a preselected number of hours, the number of days that have passed since the last calibration or on any other reasonable basis.

The frequency with which calibration should be performed to insure that the gaps distance achieved for a given setting remains the same over multiple operations is dependent on such matters such as the material from which the grinding burrs are made, the configuration of the grinding burrs and other factors such as the hardness of the ingredient being ground, and must be determined by experiment with a particular grinder unit. Operator and owner of the grinder may also be permitted to manually select a calibration whenever desired.

In any event, if a calibration is due, then the calibration is performed before the next grinding operation in step 266. If not, then the program moves directly to step 262 to adjust the grinding gap to that which has been selected by the user. This calibration is performed by first moving the grinding burrs into direct contact with each other to establish a zero gap set point from which subsequent gap settings are determined. This is preferably performed while the rotating grinding burr is rotating. The zero gap point is determined to have been achieved when the movable rotary drive motor can no longer drive the rotary grinding burr to rotate because of its engagement with the non-rotating grinding burr. This is detected of the detection circuit described above with reference to FIG. 5A. Alternatively, the stalling of the motor may be detected by means of the acoustic or vibration sensor 327 in lieu of the drive motor load sensor 216.

When the motor 300 stops, or stalls, despite being energized, a position counter or other register or the like of the parameters and input data memory 204, whose count determines the number of incremental movements of the stepper motor 324 or the piezo motor 348 that are needed for any given grinding gap size, is reset to zero. The grinding burrs 312 and 314 are engaged with each other for only a brief moment less than one second so that the stall of the drive motor is only momentary. In addition, the input power and speed of rotation of the drive motor 300 may be reduced before the grinding burrs are moved into contact with each during calibration. It is from this re-zeroed, or reset, position register from which subsequent measurements are made based, such as by counting from zero the number of control pulses needed to achieve a given amount of movement of counted for a given gap are to be counted or measured. The gap is later increased by moving the adjustable grinding burr by the preselected minimum starting distance from the zero gap set point to establish the preselected gap size associated with the selected level of grind coarseness. In this way, distance measurements are always measured from a zero gap calibration position.

While a particular embodiment has been disclosed in detail, it should be appreciated that many variations may be made without departing from the spirit and scope of the invention as defined in the appended claims.

The invention claimed is:

1. In a food grinder having a frame, a grinding chamber, a hopper for holding food ingredient to be ground with a chute for selectively passing the food ingredient to the grinding chamber, the improvement being a coarseness controllable grinding mechanism, comprising;
    an electrical, rotary, drive motor with a motor frame supporting a fixed stator surrounding a rotor mounted for elongate movement relative to the stator, said rotor fixedly attached to a central, rotary, motor axle with opposite ends that are accessible outside of opposite ends of the motor frame, respectively;
    a fixed grinding burr contained within the grinding chamber;
    a rotary grinding burr contained within the grinding chamber and separable from the fixed grinding burr by a grinding gap;
    means attaching the rotary grinding burr to one of the opposite ends of the motor axle; and
    a controllable electromechanical adjustment device engaged with another one of the opposite ends of the motor axle for automatically selectively, longitudinally moving the motor axle relative to the motor frame to adjust the grinding gap.

2. The food ingredient grinder of claim 1 including means for calibrating measurement of the longitudinal movement of the rotary grinding burr from a zero gap position.

3. The food ingredient grinder of claim 2 in which the calibrating means includes means for controlling the controllable electromechanical device to move the rotating grinding burr into contact with the fixed grinding burr until the electrical drive motor stalls to establish a zero gap set point from which subsequent gap distances are measured.

4. The food ingredient grinder of claim 1 in which the controllable electromechanical device is a servo motor.

5. The food ingredient grinder of claim 1 in which the controllable electromechanical device is a stepper motor.

6. The food ingredient grinder of claim 5 in which the stepper motor has a housing and an output pusher rod that moves longitudinally relative to the housing in response to energization of the stepper motor to push the motor axle.

7. The food ingredient grinder of claim 6 in which the pusher rod is connected to a rotary thrust bearing that is engaged with the other one of the opposite ends of drive motor axle.

8. The food ingredient grinder of claim 5 in which the stepper motor has a rotary axle that is linked to the other one of the opposite ends of the motor drive axle by a pusher linkage including a rotary thrust bearing engaged with the other one of the opposite ends of the motor drive axle in a pushing relationship.

9. The food ingredient grinder of claim 8 in which the pusher linkage includes
    an internally threaded adjustment block in supporting relationship with the rotary end bearing, and
    a mating externally threaded adjustment member threaded through the internally threaded adjustment block and connected to the stepper motor axle to rotate with the stepper motor axle,
    rotary movement of the threaded adjustment member causing the internally adjustment block to slidably move longitudinally relative to the stepper motor to adjust the grinding gap.

10. The food ingredient grinder of claim 9 in which the linkage includes means for restraining the adjustment block against rotation with rotation of the threaded member.

11. The food ingredient grinder of claim 8 in which the pusher linkage includes
an externally threaded adjustment block in supporting relationship with the rotary end bearing and connected to the stepper motor axle to rotate with the stepper motor axle;
a mating, internally threaded, linkage support frame attached to the motor frame,
said externally threaded adjustment block connected to the stepper motor axle to rotate with stepper motor axle,
rotary movement of the externally threaded adjustment block with rotation of the stepper motor axle causing the externally threaded adjustment block to slidably move longitudinally relative to the stepper motor to adjust the grinding gap.

12. The food ingredient grinder of claim 11 in which
the externally threaded adjustment block is connected to the stepper motor axle via a pair of pulley members respectively connected to the externally threaded adjustment block and the stepper motor, respectively, and interconnected by a pulley belt.

13. The food ingredient grinder of claim 1 in which
the drive motor axle is vertically aligned, and
the one of the opposite accessible ends of the motor axle with which the controllable electromechanical device is engaged is beneath and opposite to the one of the opposite ends to which the rotary grinding burr is attached, and in which
the weight of the rotor and the drive motor axle is supported at least in part by the controllable electromechanical device,
upward movement of the axle by the controllable electromechanical device being resisted by the weight of the drive motor rotor and axle while downward movement of the electromechanical device is followed by downward movement of the longitudinally movable rotor and axle due to the weight of the rotor and axle.

14. The food grinder of claim 13 in which
the drive motor is located beneath the grinding burrs, and
the hopper is located above the grinding chamber and grinding burrs.

15. The food ingredient grinder of claim 1 in which
the drive motor axle is horizontally aligned, and including
means for resiliently spring biasing the motor axle and the movable rotor to move in a direction toward the other end linked to the controllable electromechanical device, said spring biasing means causing the rotary axle to follow the adjustment device when moving away from the motor axle.

16. The food ingredient grinder of claim 15 in which the resilient pressing means includes at least one spring washer.

17. The food ingredient grinder of claim 15 in which the resilient pressing means includes a plurality of spring washers arranged together in a stack.

18. The food ingredient grinder of claim 15 in which the resilient spring biasing means resiliently presses against the other one of the ends of the drive motor axle located oppositely from the one of the accessible ends of the drive motor axle which is engaged with the controllable electromechanical means, lateral movement of the one end of the drive motor axle by the electromechanical means in a direction toward the resilient spring biasing means resisted by the spring biasing means, and movement in a direction away from the spring biasing means enabling the spring biasing means to longitudinally move the drive motor axle toward the other of the opposite ends engaged with the controllable electromechanical device.

19. The food ingredient grinder of claim 15 in which the spring biasing means engages the drive axle at the other end opposite from one end of the axle attached to the rotary grinding burr and the electromechanical adjustment device engages an end of the axle to which the rotary grinding burr is attached.

20. The food ingredient grinder of claim 19 including
an auger driven by the drive motor axle located laterally between
the grinding burrs, the grinding chamber and the controllable electromechanical device, on the one side, and
an end of the drive motor on another side, and
means for supporting the ingredient hopper above the auger.

21. In a food grinder having a pair of grinding burrs, the improvement being a coarseness setting apparatus, comprising:
means for selecting a level of grind coarseness from a plurality of different levels;
an electronic controller controlling an electromechanical device to selectively move at least one of a pair of mating grinding burrs a preselected distance to establish a preselected gap size between the grinding burrs associated with the selected level of grind coarseness;
means for calibrating the electromechanical device before establishing the preselected gap size and before a grinding operation is performed by first moving the grinding burrs into direct contact with each other to establish a zero gap set point from which subsequent gap settings are determined,
means for increasing the gap by moving the at least one grinding burr by the preselected distance from the zero gap set point to establish the preselected gap size associated with the selected level of grind coarseness; and
means for performing a grinding operation with the grinding burrs by rotating at least one of the grinding burrs while being separated from the other grinding burr by the preselected gap size.

22. The food ingredient grinder of claim 21 in which the means for calibrating is programmed to perform a calibration before each grinding cycle.

23. The food ingredient grinder of claim 21 in which the means for calibrating is programmed to perform a calibration periodically after each of a preselected plurality of grinding operations.

24. The food ingredient grinder of claim 21 in which the means for calibrating is programmed to perform a calibration periodically after a preselected number of hours of accumulative grinding operation.

25. The food ingredient grinder of claim 21 in which the means for calibrating includes
an electric drive motor for rotating one of the pair of grinding burrs,
means for moving at least one of the pair of mating grinding burrs into sufficient contact with another one of the pair of mated grinding burrs to cause the drive motor to stall;
means for detecting when the motor stalls,
means responsive to the detecting means for storing a position of the at least one mating grinding burr being moved when the drive motor stalls, and means for setting the stored position as a zero set point from which to measure subsequent the amounts of movement of the at least one grinding burr to establish different preselected gaps.

26. The food ingredient grinder of claim 21 including means for associating the plurality of different levels with a plurality of different preselected gap sizes, respectively, each gap size being unique to each level.

27. The food ingredient grinder of claim 26 in which the plurality of gap sizes is nonlinearly related to the plurality of selectable different levels.

28. The food ingredient grinder of claim 21 in which only one of the grinding burrs is moved by the electromechanical device.

29. The food ingredient grinder of claim 28, in which only the rotating grinding burr is moved by the electromechanical device.

30. The food ingredient grinder of claim 21 including means for decreasing the gap to a minimum gap size associated with the least level of grind coarseness after completion of a grinding operation.

31. The food ingredient grinder of claim 21 in which the grinding operation is performed by rotating the at least one of the grinding burrs with an electric drive motor that has a longitudinally movable rotor with an axle linked to the at least one rotating grinding burr, and the electromechanical device is an electrical stepper motor linked to the movable axle of movable rotor drive motor to move the rotating burr as needed to achieve the preselected gap.

32. The food ingredient grinder of claim 21 in which the grinding operation is performed by rotating the at least one of the grinding burrs with an electric drive motor that has a longitudinally movable rotor with an axle linked to the at least one rotating grinding burr, and the electromechanical device is a piezoelectric motor linked to the movable axle of movable rotor drive motor to move the rotating burr as needed to achieve the preselected gap.

33. The food ingredient grinder of claim 21 in which the grinding operation is performed by rotating the at least one of the grinding burrs with an electric drive motor that has a hollow drive axle containing a control rod which is connected at one end to at least one of the grinding burrs, and the step of electronically controlling includes moving the at least one of the pair of mating grinding burrs by controlling the electromechanical device to move the control rod longitudinally within the hollow axle.

34. The food ingredient grinder claim 33 in which the electromechanical device is a piezoelectric motor linked to the movable axle of movable rotor drive motor to move the rotating burr as needed to achieve the preselected gap.

35. The food ingredient grinder of claim 33 in which the electromechanical device is the electromechanical device is an electrical stepper motor linked to the movable axle of movable rotor drive motor to move the rotating burr as needed to achieve the preselected gap.

36. In a food ingredient grinder having a pair of grinding burrs contained within a grinding chamber and a hopper for holding food ingredient to be ground and selectively passing the food ingredient to the grinding chamber, the improvement being a grinding gap adjustment device, comprising:

means for manually selecting one of a plurality of different coarseness settings respectively associated with a plurality of different sized spatial gaps between the grinding burrs; and means for longitudinally linearly moving a rotary one of the pair of grinding burrs attached to a front end of a rotatable motor axle of a movable rotor drive motor by linearly moving the axle until the gap between the pair of grinding burrs corresponds to the one selected coarseness setting.

\* \* \* \* \*